United States Patent
Prakash et al.

(10) Patent No.: US 11,990,850 B2
(45) Date of Patent: May 21, 2024

(54) SOFT SWITCHED VOLTAGE SOURCE INVERTER

(71) Applicant: SCHNEIDER ELECTRIC IT CORPORATION, Foxboro, MA (US)

(72) Inventors: Indra Prakash, Bangalore (IN); Damir Klikic, Waltham, MA (US); Chandrasekaran Jayaraman, Bangalore (IN)

(73) Assignee: SCHNEIDER ELECTRIC IT CORPORATION, Foxboro, MA (US)

( * ) Notice: Subject to any disclaimer, the term of this patent is extended or adjusted under 35 U.S.C. 154(b) by 0 days.

(21) Appl. No.: 18/212,215

(22) Filed: Jun. 21, 2023

(65) Prior Publication Data
US 2023/0353064 A1 Nov. 2, 2023

Related U.S. Application Data

(63) Continuation of application No. 17/386,019, filed on Jul. 27, 2021, now Pat. No. 11,728,747.

(30) Foreign Application Priority Data

Jul. 31, 2020 (IN) .............................. 202011032979

(51) Int. Cl.
*H02M 7/5387* (2007.01)
*H02J 9/06* (2006.01)
(Continued)

(52) U.S. Cl.
CPC ......... *H02M 7/53873* (2013.01); *H02J 9/062* (2013.01); *H02M 1/0003* (2021.05);
(Continued)

(58) Field of Classification Search
CPC ............. H02M 7/003; H02M 7/53873; H02M 7/4815; H02M 1/0058; H02M 1/003; H02M 1/126; H02J 9/062
See application file for complete search history.

(56) References Cited

U.S. PATENT DOCUMENTS 9,571,005 B2  2/2017  Pahlevaninezhad et al.
9,590,531 B2  3/2017  Pahlevaninezhad et al.
(Continued)

FOREIGN PATENT DOCUMENTS

| CN | 103701356 A | 4/2014 |
| CN | 104362880 A | 2/2015 |
| CN | 105978372 A | 9/2016 |

OTHER PUBLICATIONS

Chen T. H. et al: "Soft-switching inverter for electrodynamic shaker", IEE Proceedings: Electric Power Applications, Institution of Electrical Engineers, GB, vol. 146, No. 5, Sep. 8, 1999 (Sep. 8, 1999), pp. 515-523, XP006013392, ISSN: 1350-2352, DOI: 10.1049/IP-EPA:19990413.

(Continued)

*Primary Examiner* — Adolf D Berhane
(74) *Attorney, Agent, or Firm* — Lando & Anastasi, LLP

(57) ABSTRACT

According to at least one aspect of the disclosure, an inverter is provided comprising an input configured to receive input DC power from a DC source, an output configured to provide output AC power to a load, a plurality of DC rails coupled to the input and configured to receive the input DC power from the DC source, a plurality of switches coupled between the plurality of DC rails and configured to convert the input DC power into the output AC power, each switch of the plurality of switches having a parasitic capacitance, and at least one ZVS network coupled across at least two switches of the plurality of switches, the ZVS network including at least two inductors configured to resonate with (Continued)

the parasitic capacitance of at least one switch of the plurality of switches to provide soft switching of at least one switch of the plurality of switches.

20 Claims, 19 Drawing Sheets

(51) Int. Cl.
    *H02M 1/00*     (2006.01)
    *H02M 1/12*     (2006.01)
    *H02M 7/00*     (2006.01)
    *H02M 7/48*     (2007.01)

(52) U.S. Cl.
    CPC ......... *H02M 1/0058* (2021.05); *H02M 1/126* (2013.01); *H02M 7/003* (2013.01); *H02M 7/4815* (2021.05)

(56) References Cited

U.S. PATENT DOCUMENTS

| | | |
|---|---|---|
| 10,145,929 B2 | 12/2018 | Stemmer |
| 11,362,576 B1 | 6/2022 | Rizzolatti |
| 11,387,670 B2 | 7/2022 | Nagabhushanrao et al. |
| 11,728,747 B2 * | 8/2023 | Prakash ............ H02M 7/53873 363/56.02 |
| 11,870,291 B2 * | 1/2024 | Sarnago Andia ..... H02J 7/0013 |
| 2015/0194909 A1 | 7/2015 | Pahlevaninezhad et al. |
| 2015/0236617 A1 | 8/2015 | Pahlevaninezhad et al. |
| 2015/0355306 A1 | 12/2015 | Stemmer |
| 2016/0329828 A1 | 11/2016 | Zhang et al. |
| 2018/0337613 A1 | 11/2018 | Luerkens et al. |

OTHER PUBLICATIONS

Extended European Search Report from corresponding European Application No. 21188278.2 dated Dec. 16, 2021.

* cited by examiner

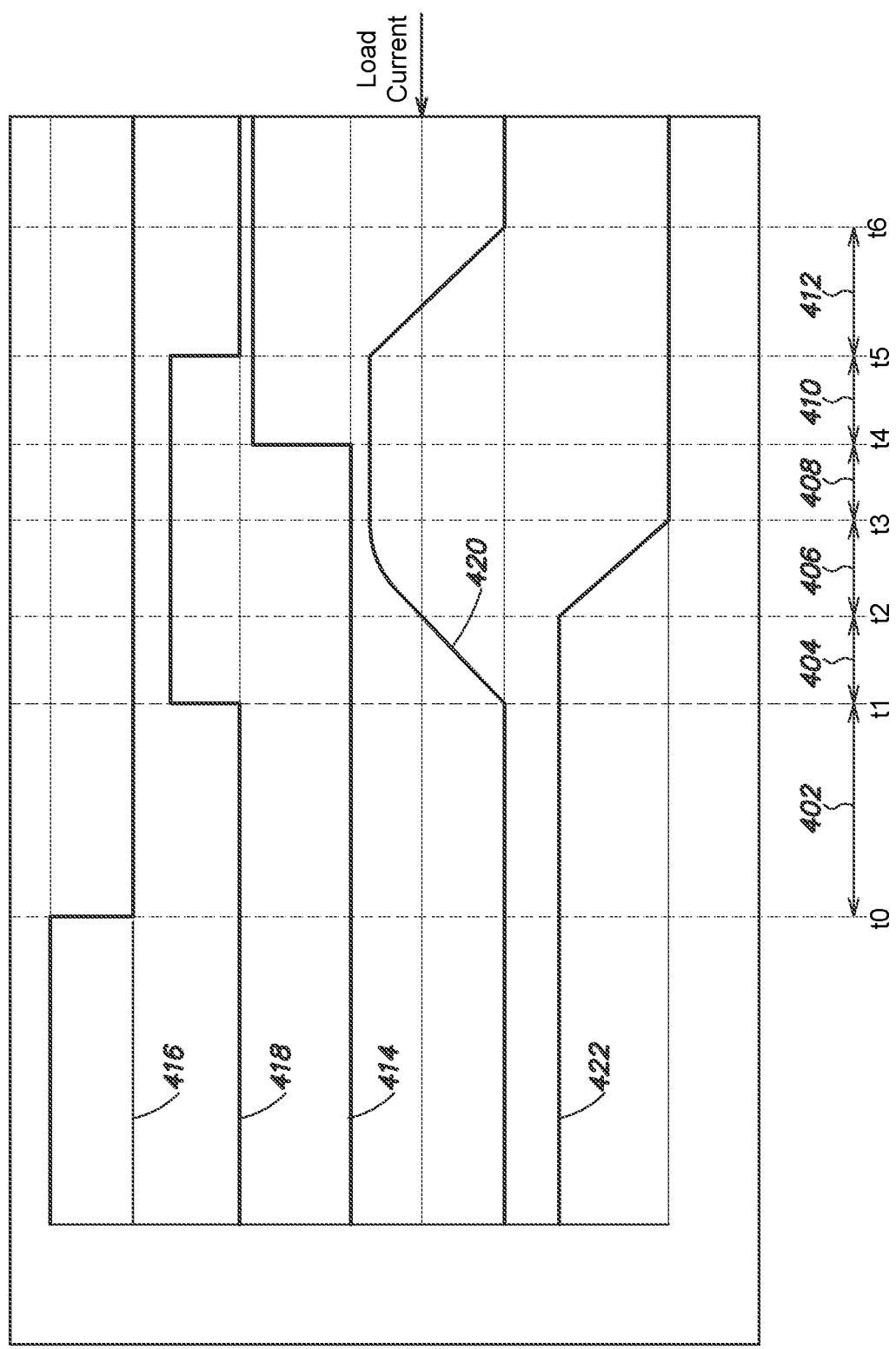

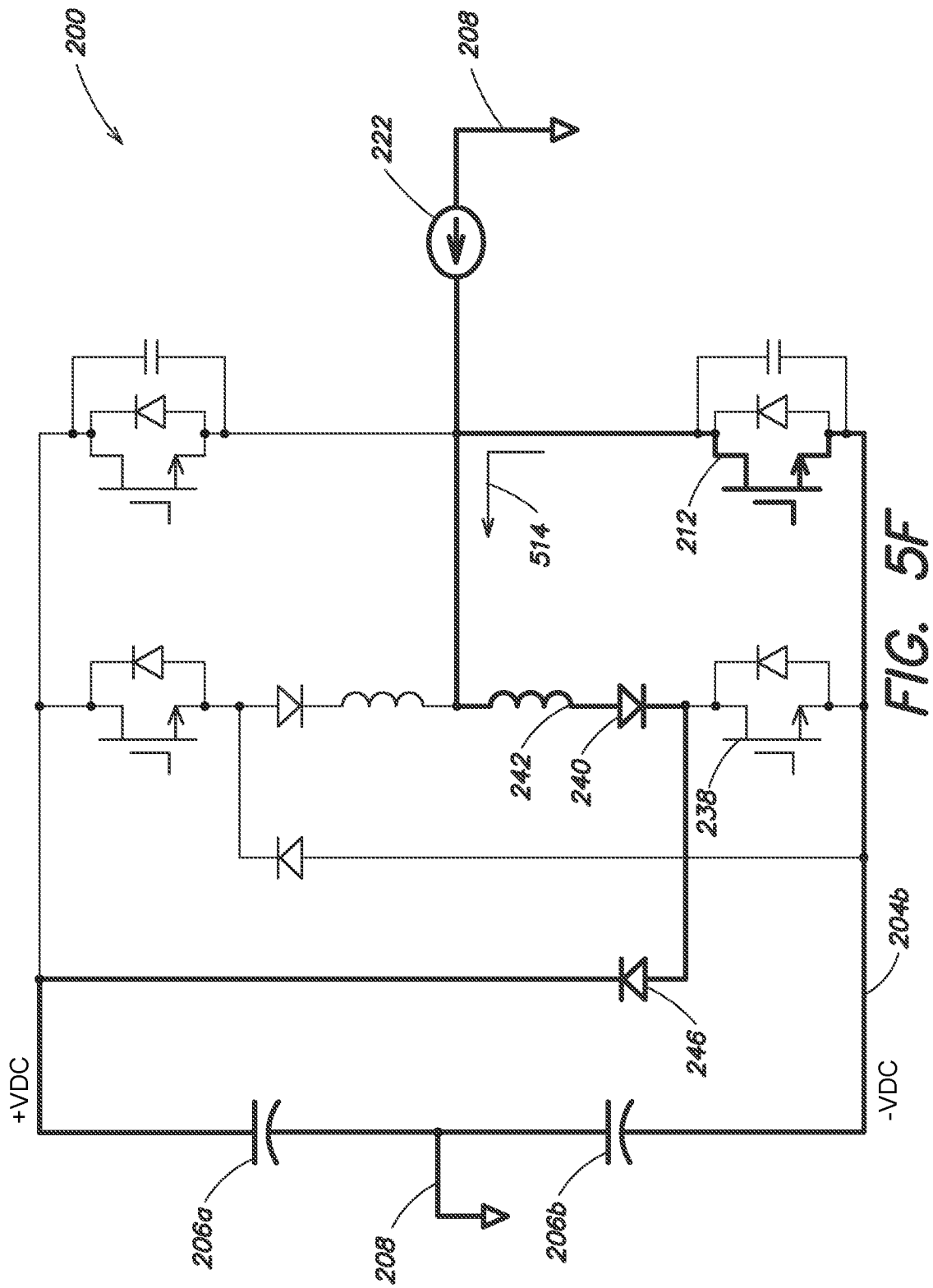

SOFT SWITCHED VOLTAGE SOURCE INVERTER

CROSS-REFERENCE TO RELATED APPLICATION

This application claims priority under 35 U.S.C. § 120 as a continuation of U.S. application Ser. No. 17/386,019, titled SOFT SWITCHED VOLTAGE SOURCE INVERTER, filed on Jul. 27, 2021, which claims the benefit under 35 U.S.C. § 119 of Indian Patent Application No. 202011032979 filed Jul. 31, 2020. Each application referenced above is hereby incorporated by reference in its entirety for all purposes.

BACKGROUND

1. Field of Invention

Embodiments of this disclosure relate generally to power conversion, and more particularly, to DC-AC power conversion in an uninterruptible power supply.

2. Discussion of Related Art

An uninterruptible power supply (UPS) is used to provide backup power to an electrical device, or load, when the primary power source, or mains, fails. Typical loads include computer systems, but other loads, such as heating/cooling/ventilation systems, lighting systems, network switches and routers, and security data center management systems may also receive backup power between 1 and 20 kVA for several hours.

SUMMARY

According to at least one aspect of the present disclosure, an inverter is provided comprising an input configured to be coupled to a DC source and to receive input DC power from the DC source, an output configured to be coupled to a load and to provide output AC power to the load, a plurality of DC rails coupled to the input and configured to receive the input DC power from the DC source, a plurality of switches coupled between the plurality of DC rails and configured to convert the input DC power into the output AC power, each switch of the plurality of switches having a parasitic capacitance, and at least one zero-voltage switching (ZVS) network coupled across at least two switches of the plurality of switches, the ZVS network including at least two inductors configured to resonate with the parasitic capacitance of at least one switch of the plurality of switches to provide soft switching of at least one switch of the plurality of switches.

According to one embodiment, the inverter further comprises a midpoint and a filter coupled between the midpoint and the output. In one embodiment, the plurality of DC rails includes a first DC rail and a second DC rail, and the plurality of switches includes a first switch coupled between the first DC rail and the midpoint and a second switch coupled between the second DC rail and the midpoint. In another embodiment, the at least one ZVS network includes a first auxiliary switch, a first diode, a first inductor coupled in series between the first DC rail and the midpoint and a second auxiliary switch, a second diode, and a second inductor coupled in series between the second DC rail and the midpoint. In one embodiment, the at least one ZVS network includes a third diode having a cathode coupled between the first auxiliary switch and the first diode and an anode coupled to the second DC rail and a fourth diode having an anode coupled between the second auxiliary switch and the second diode and a cathode coupled to the first DC rail. In another embodiment, the inverter further comprises a controller coupled to the plurality of switches and the at least one ZVS network, the controller being configured to operate, during a positive half cycle of the output AC power, the first auxiliary switch such that the first inductor resonates with the parasitic capacitance of the first and second switches to provide soft-switching of the first switch, and operate, during a negative half cycle of the output AC power, the second auxiliary switch such that the second inductor resonates with the parasitic capacitance of the first and second switches to provide soft-switching of the second switch.

According to another embodiment, the inverter further comprises a first midpoint, a second midpoint, a third midpoint, and a filter coupled between the third midpoint and the output. In one embodiment, the plurality of DC rails includes a first DC rail, a second DC rail, and a neutral rail. In another embodiment, the plurality of switches includes a first switch coupled between the first DC rail and the first midpoint, a second switch coupled between the first midpoint and the neutral rail, a third switch coupled between the neutral rail and the second midpoint, a fourth switch coupled between the second midpoint and the second DC rail, a fifth switch coupled between the first midpoint and the third midpoint, and a sixth switch coupled between the second midpoint and the third midpoint. In one embodiment, a first ZVS network of the at least one ZVS network includes a first auxiliary switch, a first diode, a first inductor coupled in series between the first DC rail and the first midpoint and a second auxiliary switch, a second diode, and a second inductor coupled in series between the neutral rail and the first midpoint.

According to one embodiment, a second ZVS network of the at least one ZVS network includes a third auxiliary switch, a third diode, a third inductor coupled in series between the neutral rail and the second midpoint and a fourth auxiliary switch, a fourth diode, and a fourth inductor coupled in series between the second DC rail and the second midpoint. In one embodiment, the first ZVS network includes a fifth diode having a cathode coupled between the first auxiliary switch and the first diode and an anode coupled to the neutral rail and a sixth diode having an anode coupled between the second auxiliary switch and the second diode and a cathode coupled to the first DC rail. In another embodiment, the second ZVS network includes a seventh diode having a cathode coupled between the third auxiliary switch and the third diode and an anode coupled to the second DC rail and an eighth diode having an anode coupled between the fourth auxiliary switch and the fourth diode and a cathode coupled to the neutral rail.

According to another embodiment, the inverter further comprises a controller coupled to the plurality of switches and the first and second ZVS networks, the controller being configured to operate the first, second, third, and fourth switches at a first switching frequency and the fifth and sixth switches at a second switching frequency to provide the output AC power, the first switching frequency being higher than the second switching frequency. In one embodiment, the controller is further configured to operate, during a positive half cycle of the output AC power, the first auxiliary switch such that the first inductor resonates with the parasitic capacitance of the first and second switches to provide soft-switching of the first switch, and operate, during a negative half cycle of the output AC power, the fourth auxiliary switch such that the fourth inductor resonates with the parasitic capacitance of the third and fourth switches to provide soft-switching of the fourth switch.

According to one embodiment, the at least one ZVS network includes a first auxiliary switch, a first diode, a first inductor coupled in series between the first midpoint and the third midpoint and a second auxiliary switch, a second diode, and a second inductor coupled in series between the second midpoint and the third midpoint. In another embodiment, the at least one ZVS network includes a third diode having a cathode coupled between the first auxiliary switch and the first diode and an anode coupled to the second midpoint and a fourth diode having an anode coupled between the second auxiliary switch and the second diode and a cathode coupled to the first midpoint.

According to another embodiment, the inverter further comprises a controller coupled to the plurality of switches and the at least one ZVS network, the controller being configured to operate the first, second, third, and fourth switches at a first switching frequency and the fifth and sixth switches at a second switching frequency to provide the output AC power, the first switching frequency being lower than the second switching frequency. In one embodiment, the controller is further configured to operate, during a positive half cycle of the output AC power, the first auxiliary switch such that the first inductor resonates with the parasitic capacitance of the fifth and sixth switches to provide soft-switching of the fifth switch, and operate, during a negative half cycle of the output AC power, the second auxiliary switch such that the second inductor resonates with the parasitic capacitance of the fifth and sixth switches to provide soft-switching of the sixth switch.

According to another aspect of the present disclosure, a non-transitory computer-readable medium is provided storing thereon sequences of computer-executable instructions for controlling an inverter including an input configured to be coupled to a DC source and to receive input DC power from the DC source, an output configured to be coupled to a load and to provide output AC power to the load, a plurality of DC rails coupled to the input and configured to receive the input DC power from the DC source, a plurality of switches coupled between the plurality of DC rails, and at least one zero-voltage switching (ZVS) network coupled across at least two switches of the plurality of switches, the ZVS network including at least two inductors, the sequences of computer-executable instructions including instructions that instruct at least one processor to operate the plurality of switches to convert the input DC power into the output AC power, and operate the at least one ZVS network such that the at least two inductors resonate with a parasitic capacitance of at least one switch of the plurality of switches to provide soft switching of at least one switch of the plurality of switches.

According to one embodiment, the plurality of DC rails includes a first DC rail and a second DC rail and the plurality of switches includes a first switch coupled between the first DC rail and a midpoint and a second switch coupled between the second DC rail and a midpoint and the at least one ZVS network includes a first auxiliary switch and a first inductor coupled in series between the first DC rail and the midpoint and a second auxiliary switch and a second inductor coupled in series between the second DC rail and the midpoint, the sequences of instructions include instructions that cause the at least one processor to operate, during a positive half cycle of the output AC power, the first auxiliary switch such that the first inductor resonates with the parasitic capacitance of the first and second switches to provide soft-switching of the first switch, and operate, during a negative half cycle of the output AC power, the second auxiliary switch such that the second inductor resonates with the parasitic capacitance of the first and second switches to provide soft-switching of the second switch.

According to another embodiment, the plurality of DC rails includes a first DC rail, a second DC rail, and a neutral rail and the plurality of switches includes a first switch coupled between the first DC rail and a first midpoint, a second switch coupled between the first midpoint and the neutral rail, a third switch coupled between the neutral rail and a second midpoint, a fourth switch coupled between the second midpoint and the second DC rail, a fifth switch coupled between the first midpoint and a third midpoint, and a sixth switch coupled between the second midpoint and the third midpoint, the sequences of instructions include instructions that cause the at least one processor to operate the first, second, third, and fourth switches at a first switching frequency and the fifth and sixth switches at a second switching frequency to provide the output AC power, the first switching frequency being higher than the second switching frequency.

According to one embodiment, a first ZVS network of the at least one ZVS network includes a first auxiliary switch and a first inductor coupled in series between the first DC rail and the first midpoint and a second auxiliary switch and a second inductor coupled in series between the neutral rail and the first midpoint and a second ZVS network of the at least one ZVS network includes a third auxiliary switch and a third inductor coupled in series between the neutral rail and the second midpoint and a fourth auxiliary switch and a fourth inductor coupled in series between the second DC bus and the second midpoint, the sequences of instructions include instructions that cause the at least one processor to operate, during a positive half cycle of the output AC power, the first auxiliary switch such that the first inductor resonates with the parasitic capacitance of the first and second switches to provide soft-switching of the first switch, and operate, during a negative half cycle of the output AC power, the fourth auxiliary switch such that the fourth inductor resonates with the parasitic capacitance of the third and fourth switches to provide soft-switching of the fourth switch.

According to another embodiment, the plurality of DC rails includes a first DC rail and a second DC rail and the plurality of switches includes a first switch coupled between the first DC rail and a first midpoint, a second switch coupled between the first midpoint and a neutral rail, a third switch coupled between the neutral rail and a second midpoint, a fourth switch coupled between the second midpoint and the second DC rail, a fifth switch coupled between the first midpoint and a third midpoint, and a sixth switch coupled between the second midpoint and the third midpoint, the sequences of instructions include instructions that cause the at least one processor to operate the first, second, third, and fourth switches at a first switching frequency and the fifth and sixth switches at a second switching frequency to provide the output AC power, the first switching frequency being lower than the second switching frequency.

According to one embodiment, the at least one ZVS network includes a first auxiliary switch and a first inductor coupled in series between the first midpoint and the third midpoint and a second auxiliary switch and a second inductor coupled in series between the second midpoint and the third midpoint, the sequences of instructions including instructions that cause the at least one processor to operate, during a positive half cycle of the output AC power, the first auxiliary switch such that the first inductor resonates with the parasitic capacitance of the fifth and sixth switches to provide soft-switching of the fifth switch, and operate, during a negative half cycle of the output AC power, the second auxiliary switch such that the second inductor resonates with the parasitic capacitance of the fifth and sixth switches to provide soft-switching of the sixth switch.

At least one aspect of the present disclosure provides a method of assembling an inverter, the method comprising providing an input configured to be coupled to a DC source and to receive input DC power from the DC source, providing an output configured to be coupled to a load and to provide output AC power to the load, coupling a plurality of DC rails to the input, the plurality of DC rails being configured to receive the input DC power from the DC source, coupling a plurality of switches between the plurality of DC rails, the plurality of switches being configured to convert the input DC power into the output AC power, each switch of the plurality of switches having a parasitic capacitance, and coupling at least one zero-voltage switching (ZVS) network across at least two switches of the plurality of switches, the at least one ZVS network including at least two inductors configured to resonate with the parasitic capacitance of at least one switch of the plurality of switches to provide soft switching of at least one switch of the plurality of switches.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments and are incorporated in and constitute a part of this specification but are not intended as a definition of the limits of the invention. In the figures, each identical or nearly identical component that is illustrated in various figures is represented by a like numeral. For purposes of clarity, not every component may be labeled in every figure. In the figures:

FIG. 4 is a timing diagram corresponding to the operation of the inverter of FIG. 2 in accordance with aspects described herein;

FIGS. 5A-5F are schematic diagrams of the inverter of FIG. 2 during a negative half cycle in accordance with aspects described herein;

DETAILED DESCRIPTION

Figure 1:
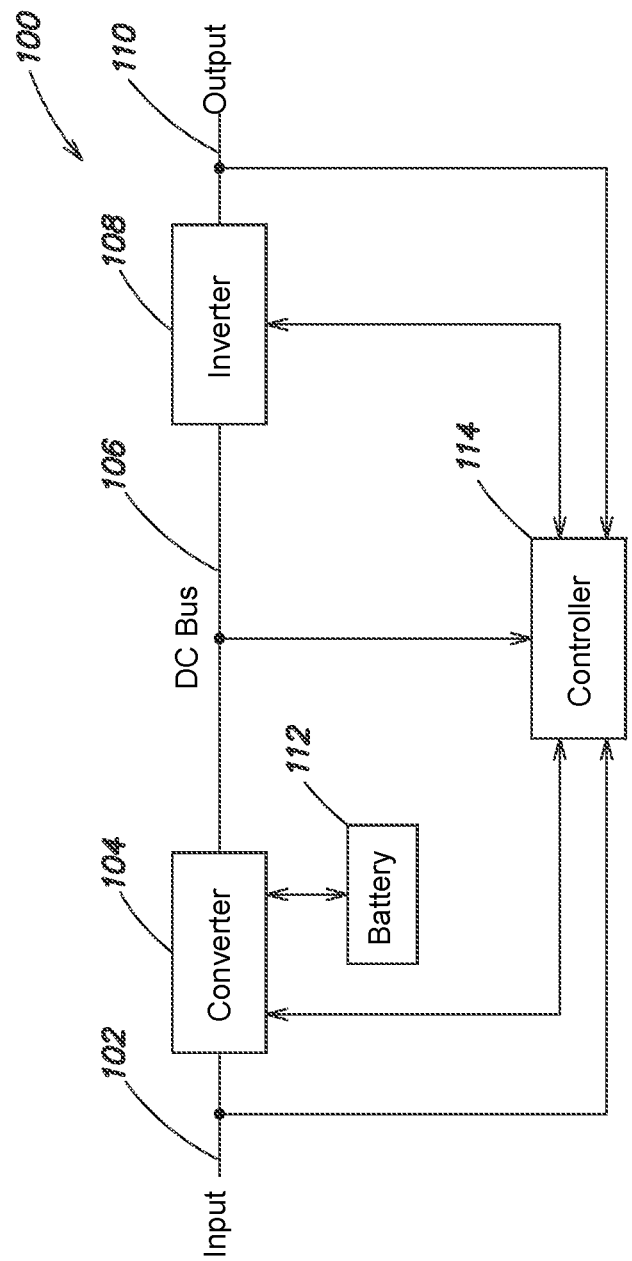
FIG. 1 is a functional block diagram of a UPS in accordance with aspects described herein.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

As discussed above, power devices, such as uninterruptible power supplies (UPS), may be used to provide regulated, uninterrupted power to sensitive and/or critical loads. An online UPS rectifies input AC power provided by an electric utility using a Power Factor Correction converter (PFC) circuit to provide DC power to at least one DC bus. The rectified DC power on the DC bus(es) may be used to charge a battery while mains power is available. In the absence of mains power, the battery discharges and provides DC power to the DC bus(es). From the DC power on the DC bus(es), an inverter generates an AC output voltage that is provided to a load. Since power is provided to the DC bus(es) from either mains or the battery, the output power of the UPS is uninterrupted if the mains fails and the battery is sufficiently charged. Online UPS's may also operate in a bypass mode where unconditioned power with basic protection is provided directly from an AC power source to a load via a bypass line.

For some applications, such as low switching frequency applications, the inverter of the UPS can be configured with silicon devices, such as IGBT and MOSFET switches. However, in high switching frequency applications, these types of switches can experience poor switching performance. In some cases, the inverter can be configured as a zero-voltage switching (ZVS) inverter and/or include SiC or GaN FET switches to provide low switching losses at higher switching frequencies. However, ZVS inverters typically operate with complex timing controls and/or require sensing of the load current. In addition, SiC or GaN FET switches can be expensive relative to alternative devices (e.g., silicon devices) and can increase the cost of the inverters.

Accordingly, improved soft switched voltage source inverters are provided herein. In at least one embodiment, the inverters include at least one resonant ZVS network configured to provide soft switching of the inverter switches. In some examples, the ZVS inverters are configured to operate with less complex timing controls, reduced conduction losses, and minimal EMI noise. In certain examples, the ZVS inverters are configured with silicon devices and can provide improved efficiency, power density, and cost.

FIG. 1 is a block diagram of one embodiment of an online UPS 100 that can provide regulated power from input AC power received at an input 102, as well as back-up DC power from a backup power source 112 (e.g., a battery), to an output 110. The UPS 100 can be configured to provide output AC power that is voltage and frequency independent from the input AC power. In some examples, the backup power source 112 may be included in the UPS 100; however, in other examples, the backup power source 112 may be external to the UPS 100. The UPS 100 includes a converter 104, a DC bus 106, an inverter 108, and a controller 114 for controlling the converter 104 and the inverter 108. The DC bus 106 is coupled between the converter 104 and the inverter 108.

The input 102 is configured to receive input AC power having an input voltage level from an AC power source. The controller 114 monitors the input AC power received by the input 102 and is configured to operate the UPS 100 in different modes of operation based on the status of the input AC power received by the input 102. When AC power provided to the input 102 is acceptable (i.e., above an input power quality threshold), the controller 114 operates the UPS 100 in an online mode of operation.

In the online mode of operation, AC power from the input 102 is provided to the converter 104. The controller 114 operates the converter 104 to convert the AC power into DC power and provide the DC power to the DC bus 106. DC power from the DC bus 106 is provided to the inverter 108. In addition, DC power from the DC bus 106 may be provided to the battery 112 for charging, either directly from the converter 104 or via a separate DC/DC converter (e.g., a charger). The controller 114 operates the inverter 108 to convert the DC power into regulated AC power and provide the regulated AC power to a load coupled to the output 110.

When AC power provided to the input 102 is not acceptable (i.e., below an input power quality threshold), the controller 114 operates the UPS 100 in a backup mode of operation. In the backup mode of operation, DC power from the backup power source 112 is provided to the DC bus 106. The inverter 108 receives the DC power from the DC bus 106, and the controller 114 operates the inverter 108 to convert the DC power from the DC bus 106 into regulated AC power and provide the regulated AC power to the output 110.

As described above, for low switching frequency applications, the inverter 108 can be configured with silicon devices, such as IGBT and MOSFET switches. However, in high switching frequency applications, these types of switches can experience poor switching performance. In certain examples, to provide low switching losses at higher switching frequencies, the inverter 108 can be configured as a zero-voltage switching (ZVS) inverter and/or include SiC or GaN based switches (e.g., Auxiliary Resonant Commutated Pole Inverter). In some examples, SiC or GaN FETs can operate with lower switching losses while maintaining low conduction losses, even in high frequency, high voltage applications. In certain examples, the use of SiC or GaN FETs can enable the inverter 108 to achieve higher power density and efficiency.

While such inverters can operate with high efficiency at high switching frequencies, they sometimes can require complex timing controls and/or sensing of the load current. For example, operation of the Auxiliary Resonant Commutated Pole Inverter can include turning on one or more switches at precise moments (e.g., end of resonant cycle). In some examples, turning on these switches at precise moments to achieve ZVS can be difficult, since the timing depends on resonant circuit component tolerances, input voltage and load conditions. In addition, if the inverter includes SiC or GaN FET switches, such switches can be expensive relative to alternative devices (e.g., IGBTs, MOSFETs) and can increase the cost of the inverters.

As such, soft switched voltage source inverters having less complex timing controls and enabling the use of silicon devices (e.g., IGBTs, MOSFETs, etc.) are described below.

Figure 2:
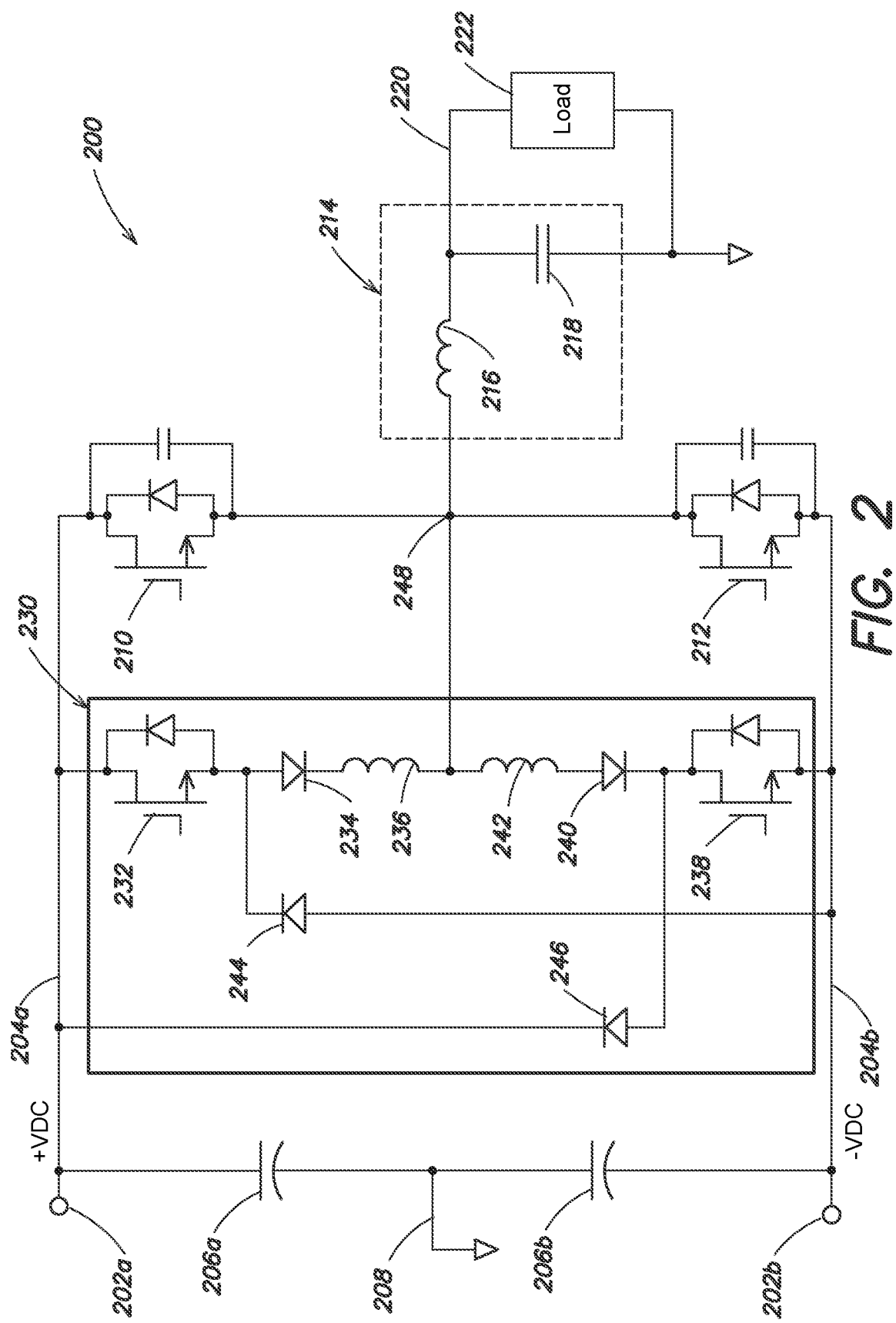
FIG. 2 is a schematic diagram of an inverter in accordance with aspects described herein.

FIG. 2 is a schematic diagram of an inverter 200 in accordance with aspects described herein. In one example, the inverter 200 is configured as a ZVS half bridge inverter. In some examples, the inverter 200 is configured to be included in a UPS (i.e., the inverter 108 of FIG. 1). As shown, the inverter 200 includes a first input 202a, a second input 202b, a first DC rail 204a, a second DC rail 204b, a first capacitor 206a, a second capacitor 206b, a neutral connection 208, a first switch 210, a second switch 212, a filter 214 including an inductor 216 and a third capacitor 218, an output 220, and a ZVS network 230. In one example, the output 220 is coupled to a load 222. In some examples, the ZVS network 230 includes a first auxiliary switch 232, a first diode 234, a first resonant inductor 236, a second auxiliary switch 238, a second diode 240, a second resonant inductor 242, a third diode 244, and a fourth diode 246.

In one example, the first and second switches 210, 212 are MOSFETs; however, in other examples, different types of switches or transistors can be utilized (e.g., IGBTs, SjFETs, etc.). Likewise, in some examples, the first and second auxiliary switches 232, 238 are IGBTs; however, in other examples, different types of switches or transistors can be utilized (e.g., MOSFETs, SjFETs, etc.). In some examples, each switch has a gate, a drain or collector, and a source or emitter. In this context, "drain" or "collector" may refer to any device terminal at which current enters the switch. Likewise, "source" or "emitter" may refer to any device terminal at which current exits the switch.

As shown, the first input 202a is coupled to the first DC rail 204a and the second input 202b is coupled to the second DC rail 204b. In one example, the first input 202a is configured to receive and provide a first DC voltage (+VDC) to the first DC rail 204a. Likewise, the second input 202b is configured to receive and provide a second DC voltage (−VDC) to the second DC rail 204b. In some examples, the first and second inputs 202a, 202b are configured to be coupled to a DC bus (e.g., DC bus 106). In one example, the first capacitor 206a is coupled between the first DC rail 204a and the neutral connection 208 and the second capacitor 206b is coupled between the second DC rail 204b and the neutral connection 208. The first switch 210 is coupled between the first DC rail 204a and a midpoint 248 and the second switch 212 is coupled between the second DC rail 204b and the midpoint 248. The filter 214 is coupled between the midpoint 248 and the output 220. In some examples, the filter 214 may be optional.

In one example, the ZVS network 230 is coupled across the first switch 210 and the second switch 212. As shown, the ZVS network 230 is coupled to the first DC rail 204a, the second DC rail 204b, and the midpoint 248. As shown, the collector (or drain) of the first auxiliary switch 232 is coupled to the first DC rail 204a and the emitter (or source) of the first auxiliary switch 232 is coupled to the anode of the first diode 234 and the cathode of the third diode 244. The first resonant inductor 236 is coupled between the cathode of the first diode 234 and the midpoint 248. Likewise, the emitter (or source) of the second auxiliary switch 238 is coupled to the second DC rail 204b and the collector (or drain) of the second auxiliary switch 238 is coupled to the cathode of the second diode 240 and the anode of the fourth diode 246. The second resonant inductor 242 is coupled between the anode of the second diode 240 and the midpoint 248. The anode of the third diode 244 is coupled to the second DC rail 204b and the cathode of the fourth diode 246 is coupled to the first DC rail 204a.

In some examples, the inverter 200 is operated to convert input DC power into output AC power and to provide the output AC power to the load 222. In one example, the input DC power corresponds to the first and second DC voltages (+VDC, −VDC) received at the first and second inputs 202a, 202b. In certain examples, the inverter 200 can be operated based on the half cycle of the output AC power. In some examples, the half cycles of the output AC power correspond to an output AC voltage waveform of the output AC power.

FIGS. 3A-3F are schematic diagrams illustrating operation of the inverter 200 during a positive half cycle of the output AC power in accordance with aspects described herein. In one example, the inverter 200 is configured to operate in multiple states corresponding to a resonant cycle during the positive half cycle of the output AC power. Likewise, FIG. 4 is a timing diagram corresponding to operation of the inverter 200 during the positive half cycle of the output AC power in accordance with aspects described herein.

In one example, FIG. 4 includes a first control signal 414 configured to control the first switch 210, a second control signal 416 configured to control the second switch 212, a third control signal 418 configured to control the first auxiliary switch 232, a first trace 420 corresponding to the current through the first resonant inductor 236, and a second trace 422 corresponding to the voltage across the first switch 210. In the illustrated example, the first and second switches 210, 212 and the first and second auxiliary switches 232, 238 are configured as active-high switches; however, in other examples, the switches may be configured differently (e.g., active-low).

Figure 3A:
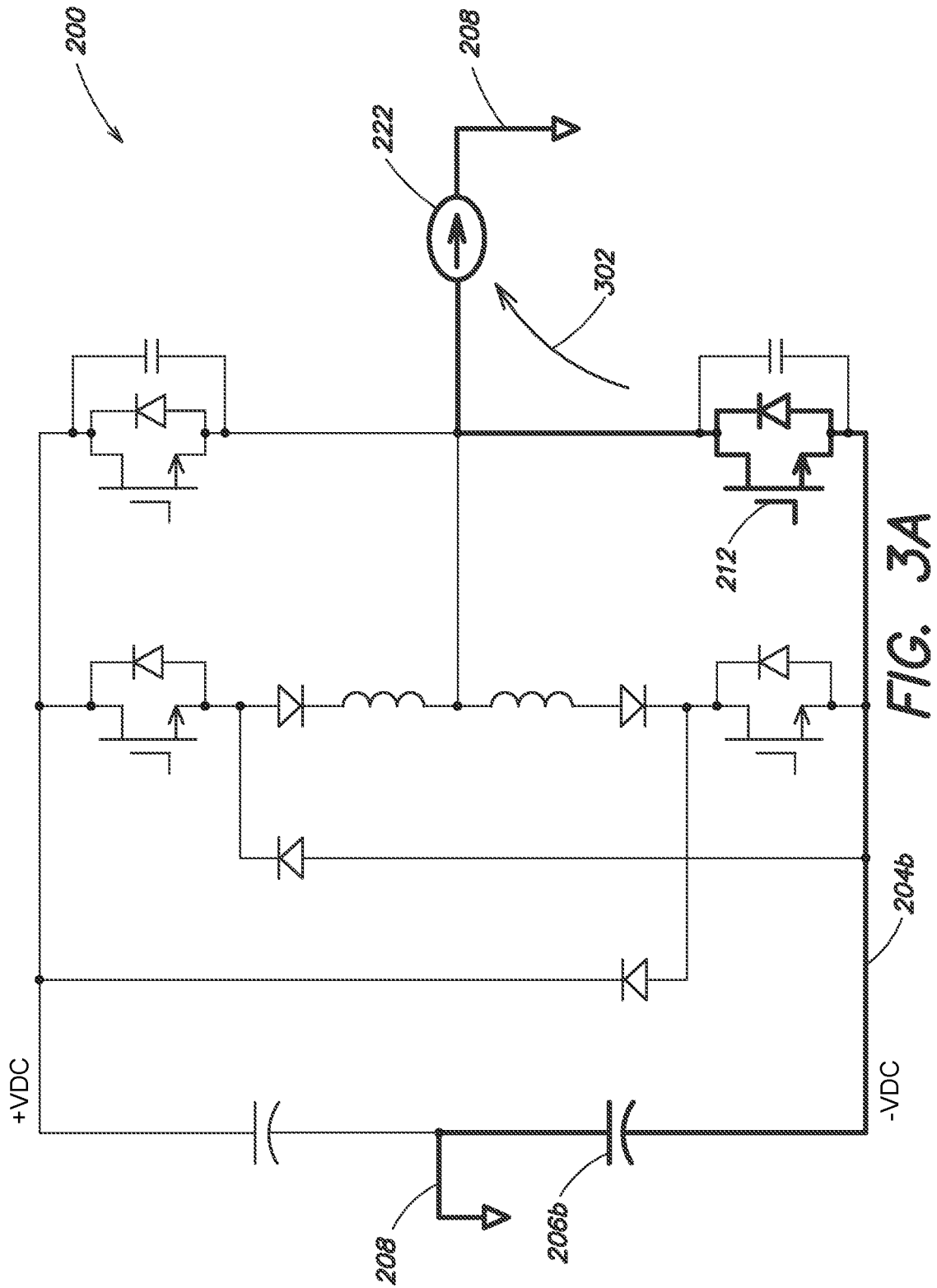
FIGS. 3A-3F are schematic diagrams of the inverter of FIG. 2 during a positive half cycle in accordance with aspects described herein.

FIG. 3A illustrates a first state of the inverter 200 during the positive half cycle of the output AC power. In one example, the first state corresponds to a first time period 402 ($t_0 < t < t_1$) of the resonant cycle. As shown in FIG. 4, during the first time period 402, the first and second control signals 414, 416 are low ('0') and the first and second switches 210, 212 are both turned off (i.e., open). As shown in FIG. 3A, a first conduction path 302 is provided to the load 222 through the second capacitor 206b, the second DC rail 204b, and the body diode of the second switch 212.

Figure 3B:
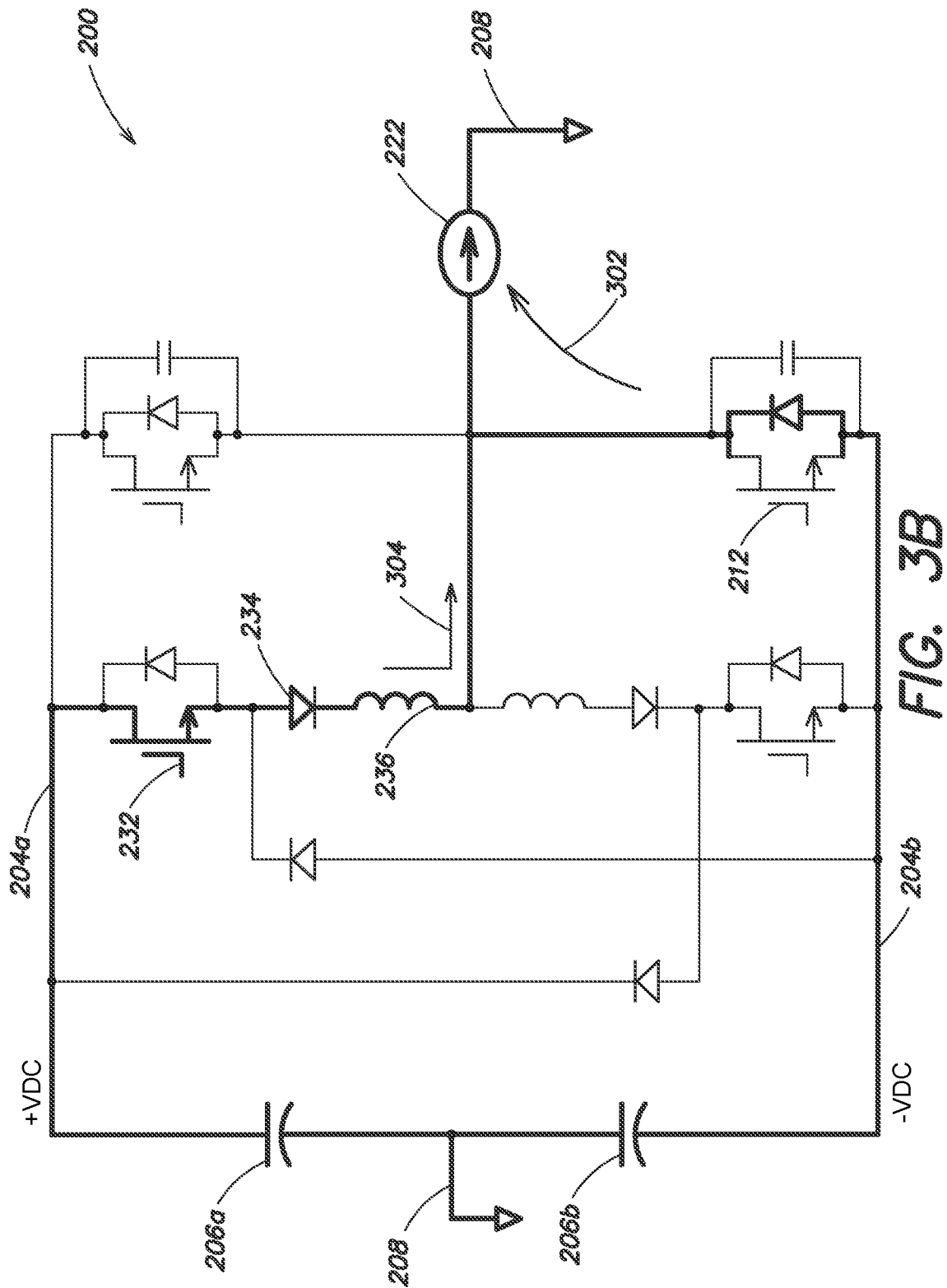

FIG. 3B illustrates a second state of the inverter 200 during the positive half cycle of the output AC power. In one example, the second state corresponds to a second time period 404 ($t_1 < t < t_2$) of the resonant cycle. As shown in FIG. 4, the third control signal 418 is driven high ('1') and the first auxiliary switch 232 is turned on (i.e., closed) at time $t_1$. By turning on the first auxiliary switch 232, the voltage across the first DC rail 204a and the second DC rail 204b (+VDC to −VDC) is applied across first resonant inductor 236 and current through the first resonant inductor 236 is ramped up linearly (indicated by trace 420). As shown in FIG. 3B, in addition to the first conduction path 302, a second conduction path 304 is provided to the load 222 through the first capacitor 206a, the first DC rail 204a, the first auxiliary switch 232, the first diode 234, and the first resonant inductor 236.

Figure 3C:
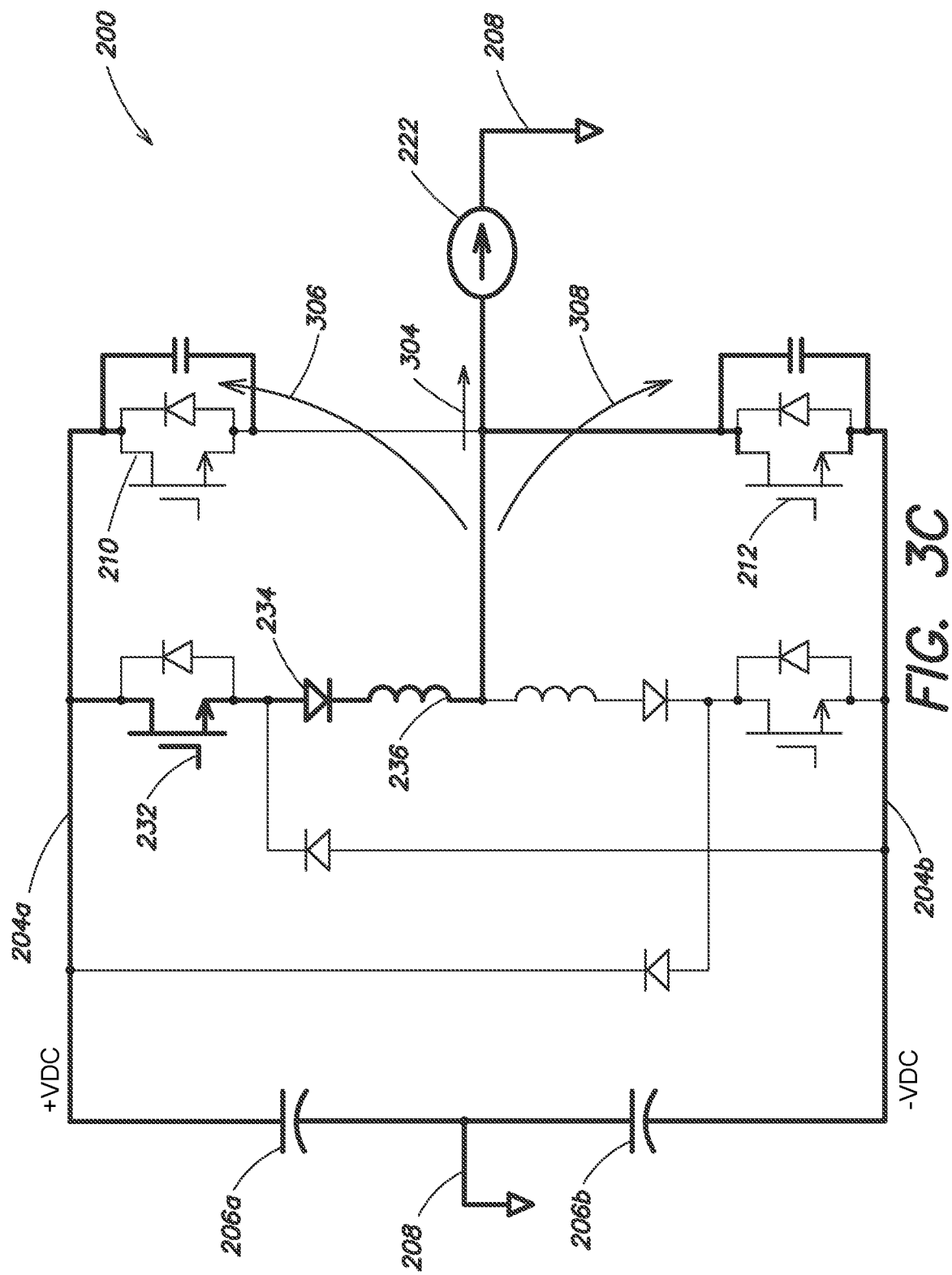

FIG. 3C illustrates a third state of the inverter 200 during the positive half cycle of the output AC power. In one example, the third state corresponds to a third time period 406 ($t_2 < t < t_3$) of the resonant cycle. As shown in FIG. 4, the current through the first resonant inductor 236 becomes equal to the load current and the body diode of the second switch 212 stops conducting at time $t_2$. From this instant onwards, the body capacitors (i.e., parasitic capacitances) of the first and second switches 210, 212 start resonating with the first resonant inductor 236, causing the voltage across the body diode of the first switch 210 to decrease and the voltage across the second switch 212 to increase. As shown in FIG. 3C, a third conduction path 306 is provided through the body capacitor of the first switch 210 to the first DC rail 204a and a fourth conduction path 308 is provided through the body capacitor of the second switch 212 to the second DC rail 204b. Once the voltage across the first switch 210 goes to 0V and the voltage across the second switch 212 reaches the full DC rail voltage (+VDC to −VDC), the current through the first resonant inductor 236 reaches its peak value (indicated by trace 420). In at least some embodiments, additional resonant capacitors can be coupled across the first and second switches 210, 212 and be configured to resonate with the first resonant inductor 236.

Figure 3D:
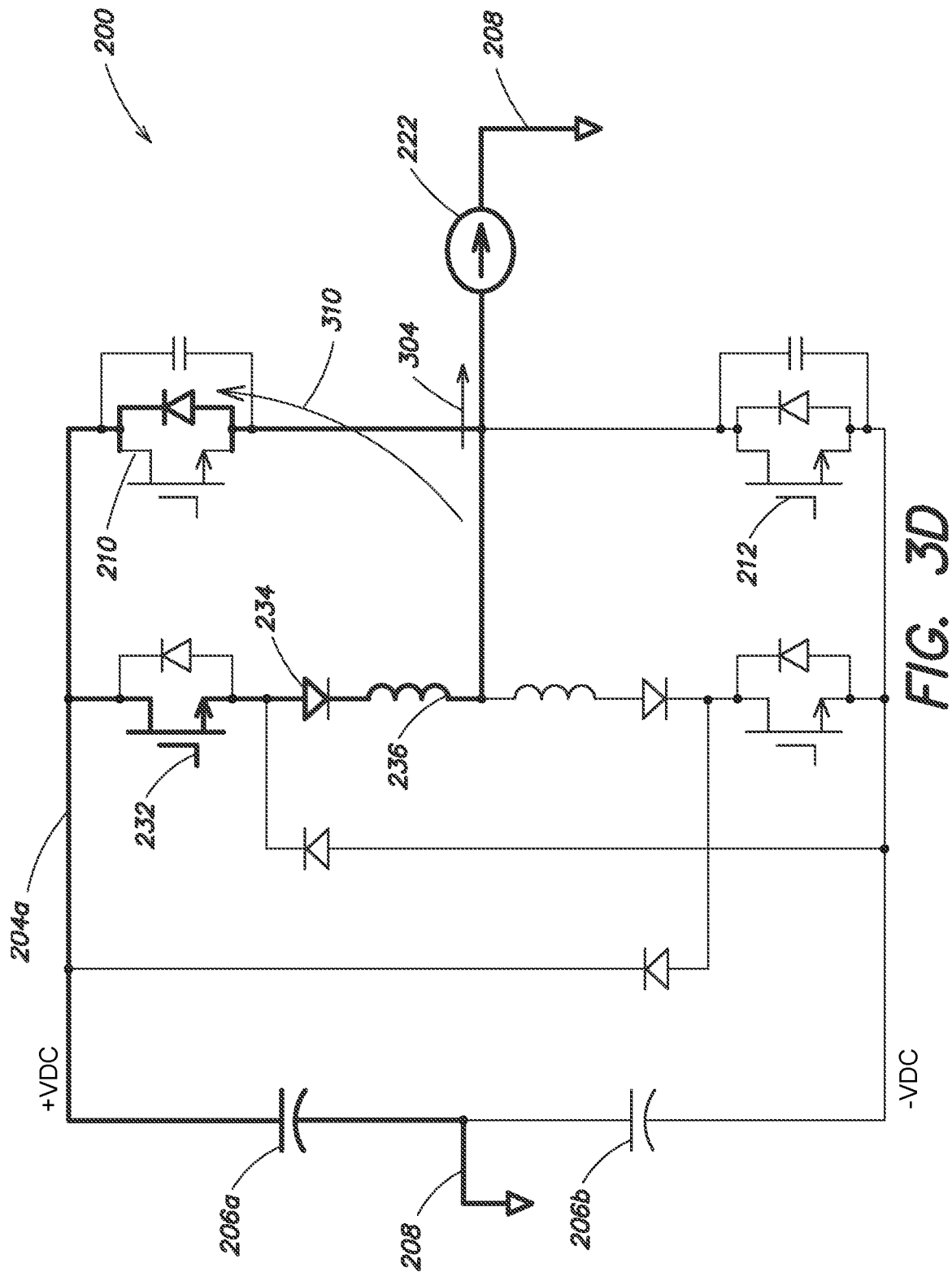

FIG. 3D illustrates a fourth state of the inverter 200 during the positive half cycle of the output AC power. In one example, the fourth state corresponds to a fourth time period 408 ($t_3 < t < t_4$) of the resonant cycle. At time $t_3$, the body diode of first switch 210 is forward biased and the current through the first resonant inductor 236 starts freewheeling, holding the voltage across the first switch 210 to 0V (as indicated by trace 422). As shown in FIG. 3D, a fifth conduction path 310 is provided to the first DC rail 204a through the body diode of the first switch 210.

Figure 3E:
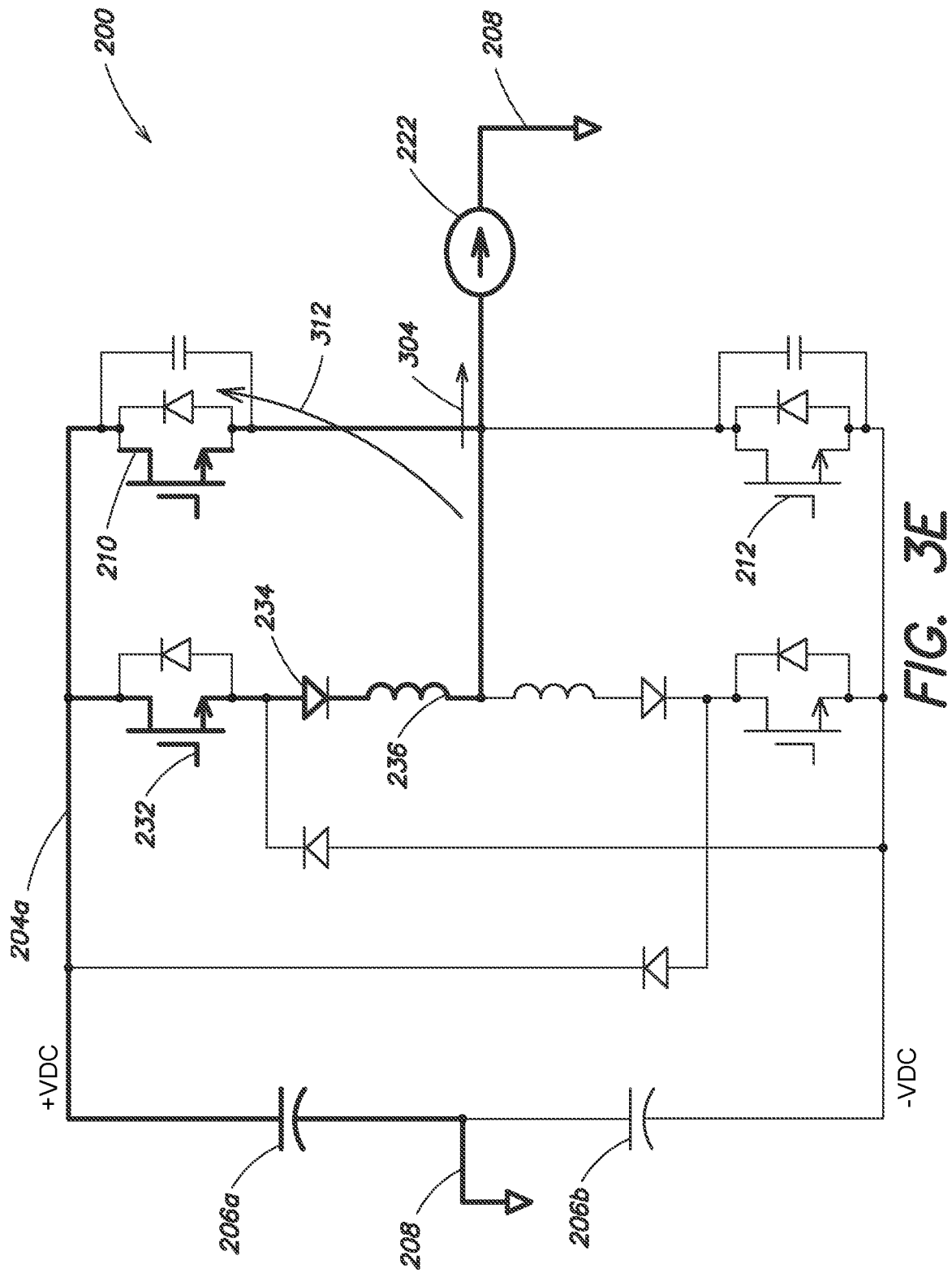

FIG. 3E illustrates a fifth state of the inverter 200 during the positive half cycle of the output AC power. In one example, the fifth state corresponds to a fifth time period 410 ($t_4 < t < t_5$) of the resonant cycle. As shown in FIG. 4, while the current through the first resonant inductor 236 is freewheeling and the voltage across the first switch 210 is being held at 0V, the first control signal 414 is driven high ('1') and the first switch 210 is turned on (i.e., closed) at time $t_4$. It should be appreciated that the first control signal 414 can be driven high ('1') at any time while the first resonant inductor 236 is freewheeling and the voltage across the first switch 210 is being held at 0V (e.g., $t_3 < t < t_5$). As shown in FIG. 3E, a sixth conduction path 312 is provided to the first DC rail 204a through the first switch 210.

Figure 3F:
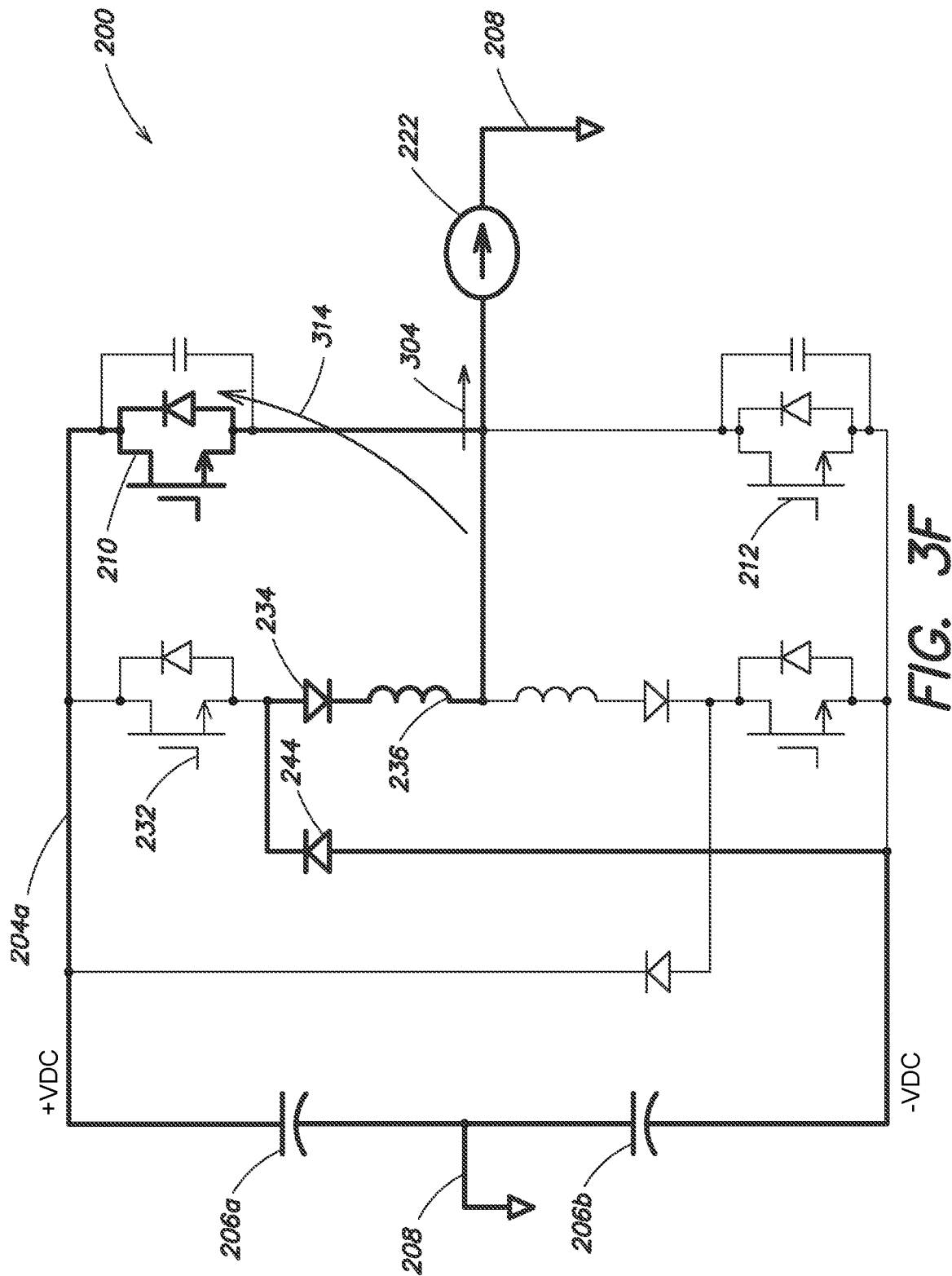

FIG. 3F illustrates a sixth state of the inverter 200 during the positive half cycle of the output AC power. In one example, the sixth state corresponds to a sixth time period 412 ($t_5 < t < t_6$) of the resonant cycle. As shown in FIG. 4, the third control signal 418 is driven low ('0') and the first auxiliary switch 232 is turned off (i.e., opened) at time $t_5$. By turning off the first auxiliary switch 232, energy stored by the first resonant inductor 236 is returned to the first DC rail 204a. As shown in FIG. 3F, a seventh conduction path 314 is provided for the energy released by the first resonant inductor 236 through the first switch 210, the first DC rail 204a, the first capacitor 206a, the second capacitor 206b, the first diode 234, and the third diode 244. In one example, the current through the first resonant inductor 236 is ramped down linearly (indicated by trace 420). At time $t_6$, the resonant cycle is completed as the current through the first resonant inductor 236 reaches OA.

Similarly, FIGS. 5A-5F are schematic diagrams illustrating operation of the inverter 200 during a negative half cycle of the output AC power in accordance with aspects described herein. In one example, the inverter 200 is configured to operate in multiple states corresponding to a resonant cycle during the negative half cycle of the output AC power.

Figure 5A:
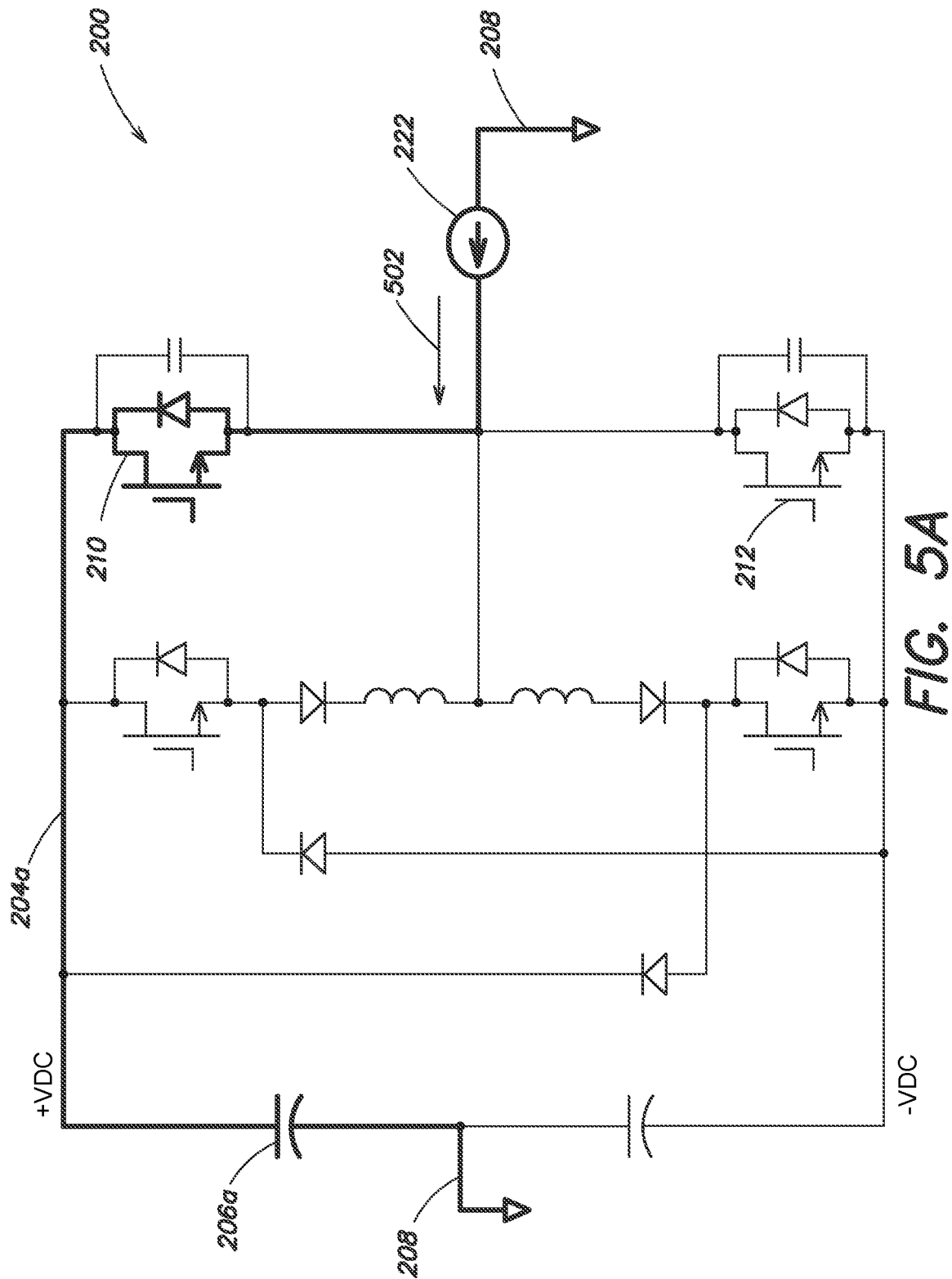

FIG. 5A illustrates a first state of the inverter 200 during the negative half cycle of the output AC power. In one example, the first state corresponds to a first time period of the resonant cycle. During the first time period, the first and second switches 210, 212 are both turned off (i.e., open). As such, as shown in FIG. 5A, a first conduction path 502 is provided to the load 222 through the first capacitor 206a, the first DC rail 204a, and the body diode of the first switch 210.

Figure 5B:
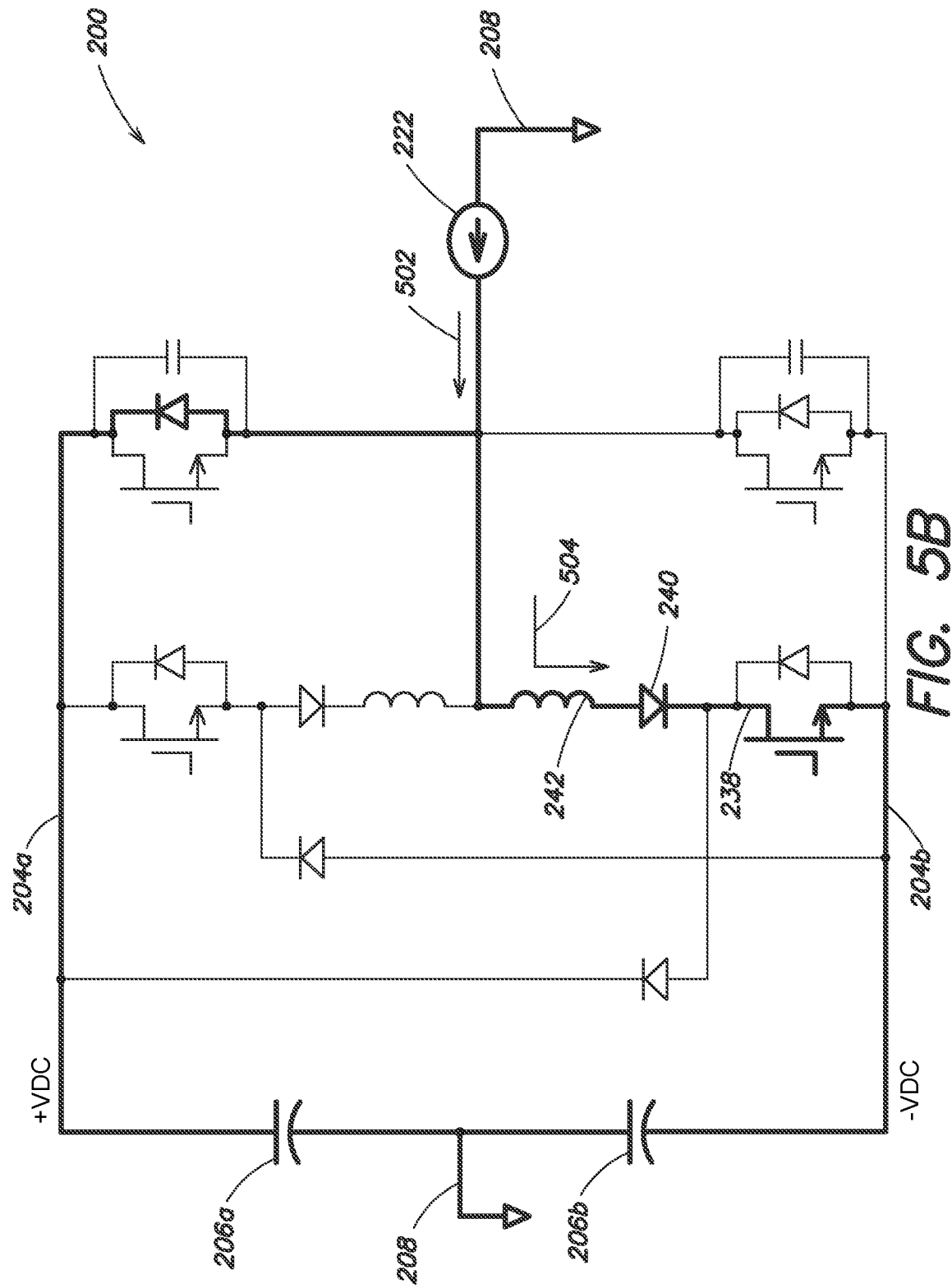

FIG. 5B illustrates a second state of the inverter 200 during the negative half cycle of the output AC power. In one example, the second state corresponds to a second time period of the resonant cycle. During the second time period, the second auxiliary switch 238 is turned on (i.e., closed). By turning on the second auxiliary switch 238, the voltage across the first DC rail 204a and the second DC rail 204b (+VDC to −VDC) is applied across the second resonant inductor 242 and current through the second resonant inductor 242 is ramped up linearly. As shown in FIG. 5B, in addition to the first conduction path 502, a second conduction path 504 is provided from the load 222 through the second capacitor 206b, the second DC rail 204b, the second auxiliary switch 238, the second diode 240, and the second resonant inductor 242.

Figure 5C:
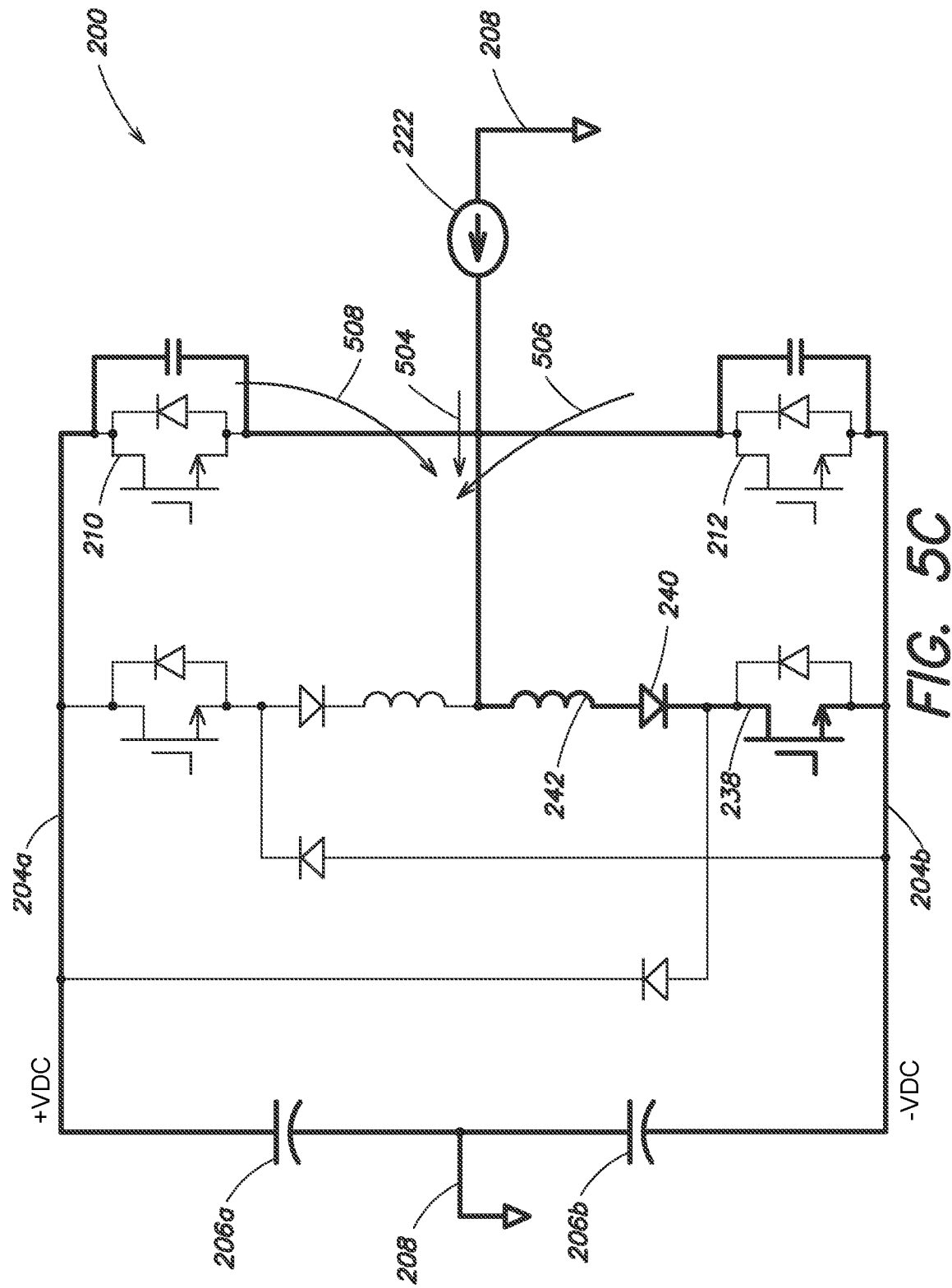

FIG. 5C illustrates a third state of the inverter 200 during the negative half cycle of the output AC power. In one example, the third state corresponds to a third time period of the resonant cycle. During the third time period, the current through the second resonant inductor 242 becomes equal to the load current and the body diode of the first switch 210 stops conducting. From this instant onwards, the body capacitors (i.e., parasitic capacitances) of the first and second switches 210, 212 start resonating with the second resonant inductor 242, causing the voltage across the body diode of the second switch 212 to decrease and the voltage across the first switch 210 to increase. As shown in FIG. 5C, a third conduction path 506 is provided through the body capacitor of the second switch 212 from the second DC rail 204b and a fourth conduction path 508 is provided through the body capacitor of the first switch 210 from the first DC rail 204a. Once the voltage across the second switch 212 goes to 0V and the voltage across the first switch 210 reaches the full DC rail voltage (+VDC to −VDC), the current through the second resonant inductor 242 reaches its peak value. In at least some embodiments, additional resonant capacitors can be coupled across the first and second switches 210, 212 and be configured to resonate with the second resonant inductor 242.

Figure 5D:
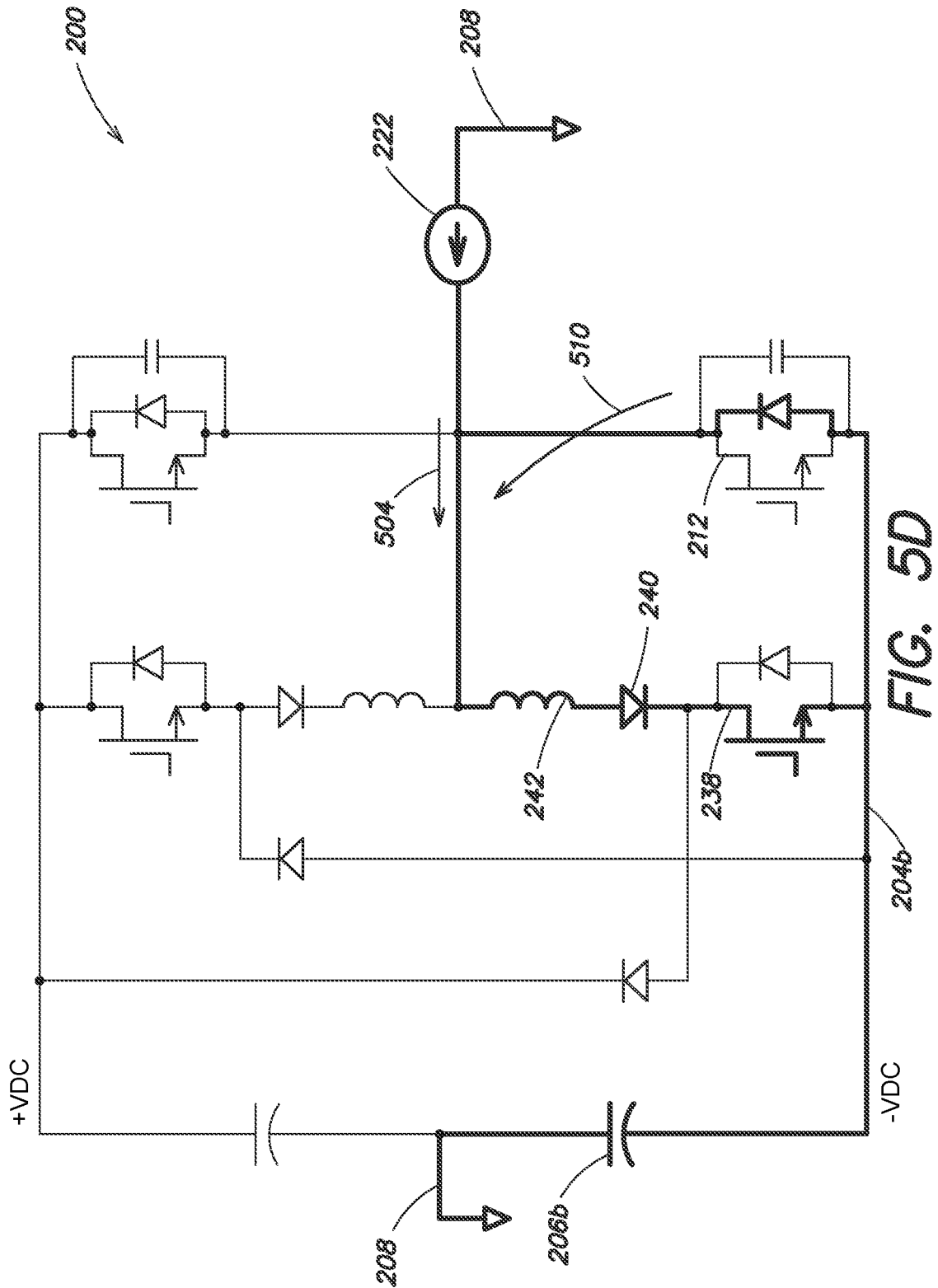

FIG. 5D illustrates a fourth state of the inverter 200 during the negative half cycle of the output AC power. In one example, the fourth state corresponds to a fourth time period of the resonant cycle. During the fourth time period, the body diode of second switch 212 is forward biased and the current through the second resonant inductor 242 starts freewheeling, holding the voltage across the second switch 212 to 0V. As shown in FIG. 5D, a fifth conduction path 510 is provided from the second DC rail 204b through the body diode of the second switch 212.

Figure 5E:
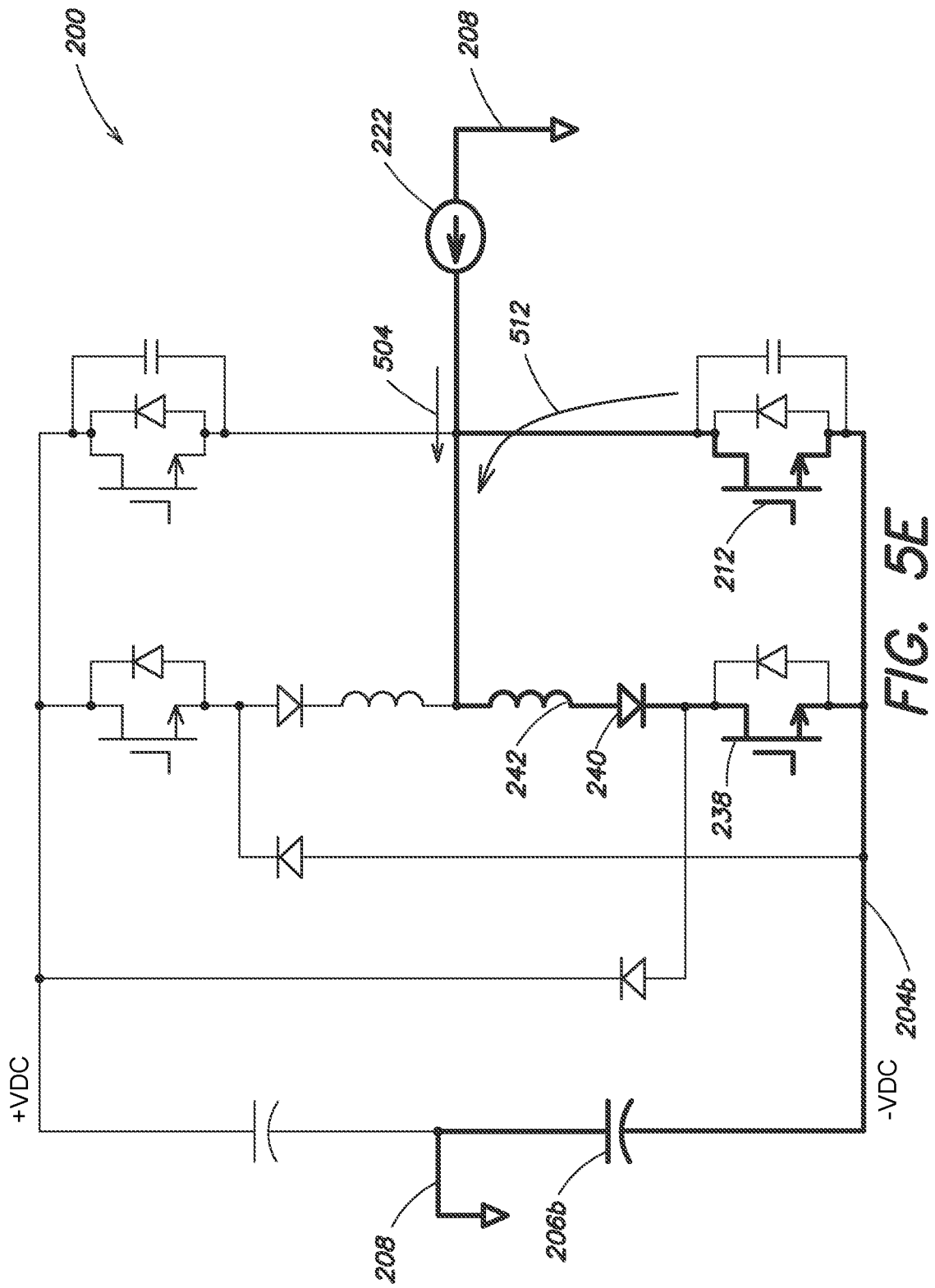

FIG. 5E illustrates a fifth state of the inverter 200 during the negative half cycle of the output AC power. In one example, the fifth state corresponds to a fifth time period of the resonant cycle. During the fifth time period, while the current through the second resonant inductor 242 is freewheeling and the voltage across the second switch 212 is being held at 0V, the second switch 212 is turned on (i.e., closed). As shown in FIG. 5E, a sixth conduction path 512 is provided from the second DC rail 204b through the second switch 212.

FIG. 5F illustrates a sixth state of the inverter 200 during the negative half cycle of the output AC power. In one example, the sixth state corresponds to a sixth time period of the resonant cycle. During the sixth time period, the second auxiliary switch 238 is turned off (i.e., opened). By turning off the second auxiliary switch 238, energy stored by the second resonant inductor 242 is returned to the second DC rail 204b. As shown in FIG. 5F, a seventh conduction path 514 is provided for the energy released by the second resonant inductor 242 through the second switch 212, the second DC rail 204b, the first capacitor 206a, the second capacitor 206b, the second diode 240, and the fourth diode 246. In one example, the current through the second resonant inductor 242 is ramped down linearly. The resonant cycle is completed as the current through the second resonant inductor 242 reaches 0A.

In one example, operating the inverter 200 as described above enables lossless operation (e.g., turn on) of the first and second switches 210, 212. In some examples, reverse recovery transients and losses associated with the body diodes of first and second switches 210, 212 can be eliminated. In certain examples, the EMI/RFI of the inverter 200 can be minimized by eliminating such reverse recovery transients (e.g., at the midpoint 248). In addition, $E_{oss}$ losses associated with the parasitic capacitances of the first and second switches 210, 212 can be reduced (i.e., the loss corresponding to energy stored in the body capacitance of the switch that is dissipated at turn on).

As described above, the first and second switches 210, 212 may be configured as silicon devices (e.g., MOSFETs, IGBTs, etc.). In one example, the inverter 200 enables the use of silicon devices while achieving performance similar to wide-bandgap (WBG) device based inverters. In some examples, the use of silicon devices enables the cost of the inverter to be reduced while improving reliability.

In addition, the ZVS network 230 of the inverter 200 can provide inherent shoot-through protection. For example, during the positive half cycle, the first auxiliary switch 232 is turned on (i.e., closed) before the first switch 210. Current through the first auxiliary switch 232 and the second switch 212 increases linearly (limited by the first resonant inductor 236). If the second switch 212 is shorted, resonance will not occur and the first switch 210 will not be turned on (i.e., closed). Current through the first switch 210 will continue to increase and a current limit protection circuit (not shown) can detect the fault. Hence, the ZVS network 230 provides inherent shoot-through protection irrespective of the devices used for the first and second switches 210, 212, enabling the use of devices sensitive to shoot-through conditions (e.g., MOSFETs).

As described above, the inverter 200 is configured to use simplified timing controls to achieve lossless operation (i.e., zero voltage switching) of the first and second switches 210, 212. For example, the resonant cycles of the inverter 200 allow the first and second switches 210, 212 to be operated without requiring the switches to be turned on/off at precise moments. In one example, the inverter 200 is configured to use a control architecture including voltage sensing circuitry and logic circuitry and/or algorithms to provide the timing controls.

Figure 6:
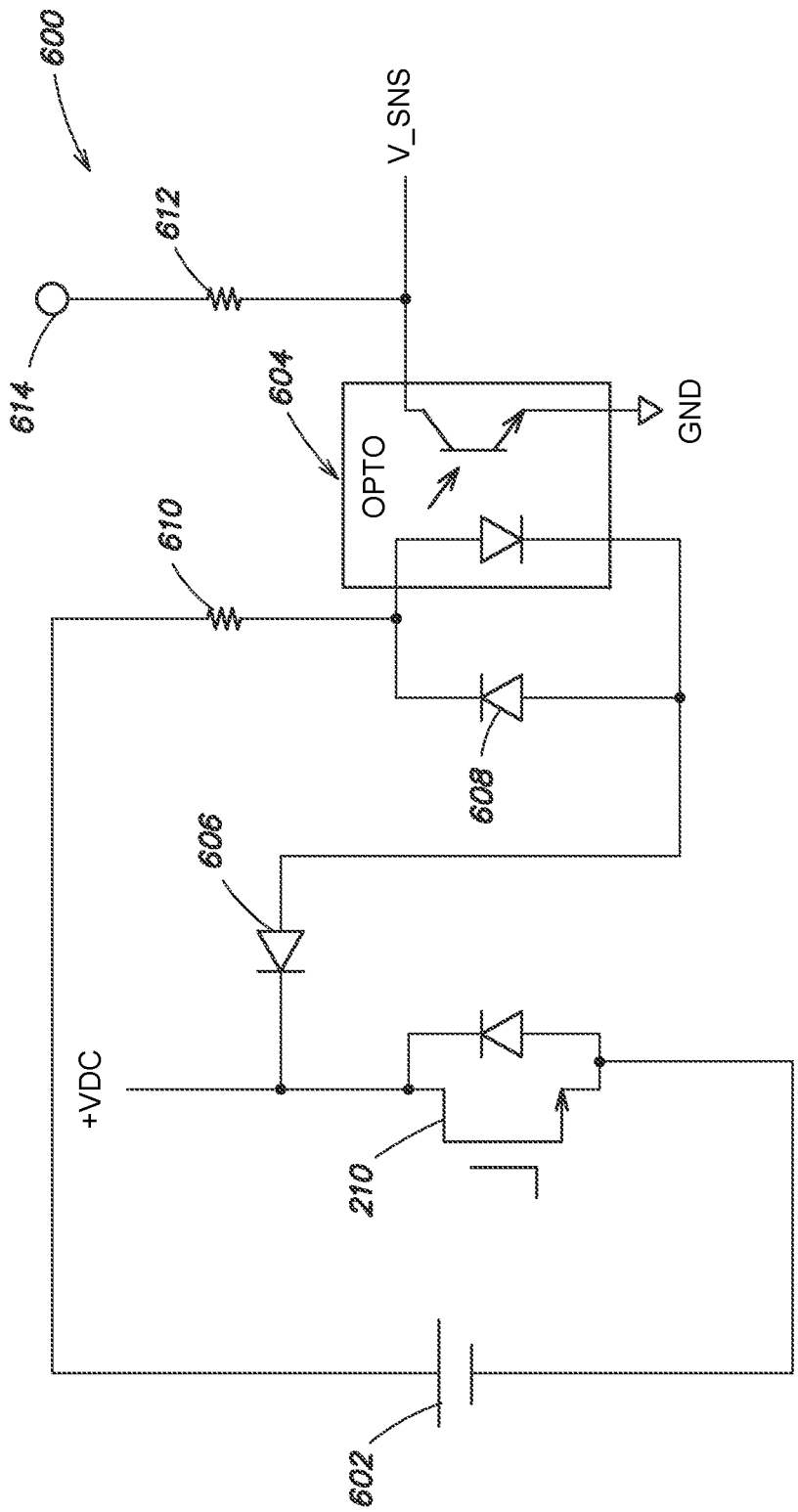
FIG. 6 is a schematic diagram of a voltage sensing circuit in accordance with aspects described herein.

FIG. 6 is a schematic diagram of a voltage sensing circuit 600 in accordance with aspects described herein. In one example, the voltage sensing circuit 600 can be used to sense the voltage across the first switch 210 and/or the second switch 212 of the inverter 200. As shown, the voltage sensing circuit 600 includes a voltage source 602, an optocoupler 604, a first diode 606, a second diode 608, a first resistor 610, and a second resistor 612. In the illustrated example, the voltage sensing circuit 600 is configured to sense the voltage across the first switch 210 of the inverter 200.

The voltage sensing circuit 600 is configured to provide an output signal V_SNS indicating the voltage across the first switch 210. In one example, the output signal V_SNS is low ('0') if the voltage across the first switch 210 is less than a fixed voltage (e.g., 10V), and high ('1') otherwise. In some examples, the voltage source 602 is configured to apply the fixed voltage (e.g., 10V) across the first switch 210 and the optocoupler 604. When voltage across the first switch 210 becomes less than the fixed voltage of the voltage source 602 (e.g., 10V), a conduction path is provided through the first resistor 610, the LED of the optocoupler 604, the first diode 606, and the first switch 210 and the output signal V_SNS is driven low ('0'). Otherwise the output signal V_SNS is driven high ('1'). In certain examples, the voltage level of the high ('1') state of the output signal V_SNS corresponds to a logic voltage (e.g., 5V) at node 614 coupled to the second resistor 612.

Figure 7:
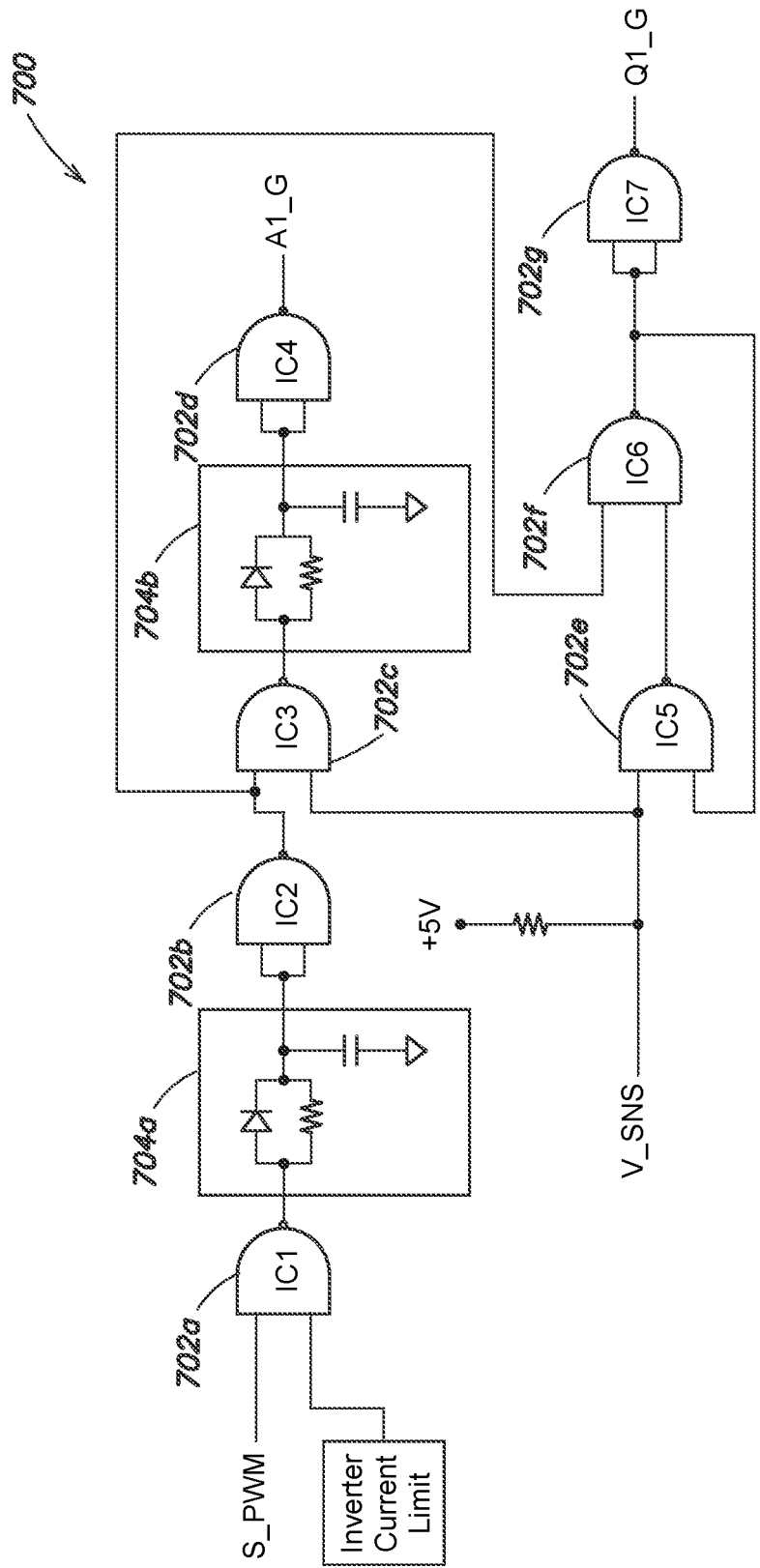
FIG. 7 is a schematic diagram of a switching logic circuit in accordance with aspects described herein.

FIG. 7 is a schematic diagram of a switching logic circuit 700 in accordance with aspects described herein. In one example, the voltage sensing circuit 700 can be used to control the first switch 210 and/or the second switch 212 of the inverter 200. As shown, the switching logic circuit 700 includes a plurality of logic gates 702, a first delay circuit 704a, and a second delay circuit 704b. In some examples, each logic gate of the plurality of logic gates 702 is configured as a NAND gate; however, in other examples, the logic gates may be configured differently (e.g., AND gates). In the illustrated example, the switching logic circuit 700 is configured to control the first switch 210 of the inverter 200.

In one example, the switching logic circuit 700 is configured to receive a sinusoidal pulse width modulation (SPWM) signal S_PWM corresponding to operation of the first switch 210. In some examples, the signal S_PWM is provided by a closed-loop control circuit. Likewise, the switching logic circuit 700 is configured to receive the output signal V_SNS from the voltage sensing circuit 600 indicating the voltage across the first switch 210. In one example, the switching logic circuit 700 is configured to provide a first output signal A1_G for controlling the gate of the first auxiliary switch 232 and a second control signal Q1_G for controlling the gate of the first switch 210. In certain examples, the switching logic circuit 700 is configured to receive a current limit signal indicating the state of the inverter 200 (e.g., shoot-through condition).

In some examples, the switching logic circuit 700 can be operated to add delay to the signal S_PWM to provide the zero-voltage switching of the first switch 210. For example, the first delay circuit 404a may be configured to provide a first amount of delay corresponding to the turn on time of the first switch 210 and the second delay circuit 704b may be configured to provide a second amount of delay corresponding to the turn off time of the first auxiliary switch 232. In certain examples, the delay added by the switching logic circuit 700 may compensate for dead-band zones in the signal S_PWM. In this context, "dead-band" corresponds to input values where the output is zero (i.e., no action occurs).

As described above, in the first state of the inverter 200 during the positive half cycle of the output AC power, the second switch 212 is off and current is provided through body diode of the second switch 212 prior to turning on the first switch 210 or the first auxiliary switch 232 (FIG. 3A). During this state, S_PWM is low ('0'), V_SNS is high ('r), and both A1_G and Q1_G are low ('0'). When it is time to turn the first switch 210 on, S_PWM goes high. Since V_SNS is already high ('r), the output signal Q1_G remains low ('0') and the output signal A1_G is driven high ('1') after the dead-band delay provided by the delay circuits 704a, 704b. After the first auxiliary switch 232 is turned on (via A1_G), V_SNS is driven low ('0') and the output signal Q1_G is driven high ('1'). The output signal A1_G is then driven low ('0') again after the delay provided by the delay circuits 704a, 704b. In one example, the logic gates 702e, 702f form a latch that ensures the output signal Q1_G does not go low again after going high, unless S_PWM goes low. While not shown, a similar control architecture can be used for operating or controlling the second switch 212 and the second auxiliary switch 238.

While the inverter 200 is configured as a half-bridge inverter, it should be appreciated that the soft-switching techniques and controls described above can be applied to different inverter topologies.

Figure 8:
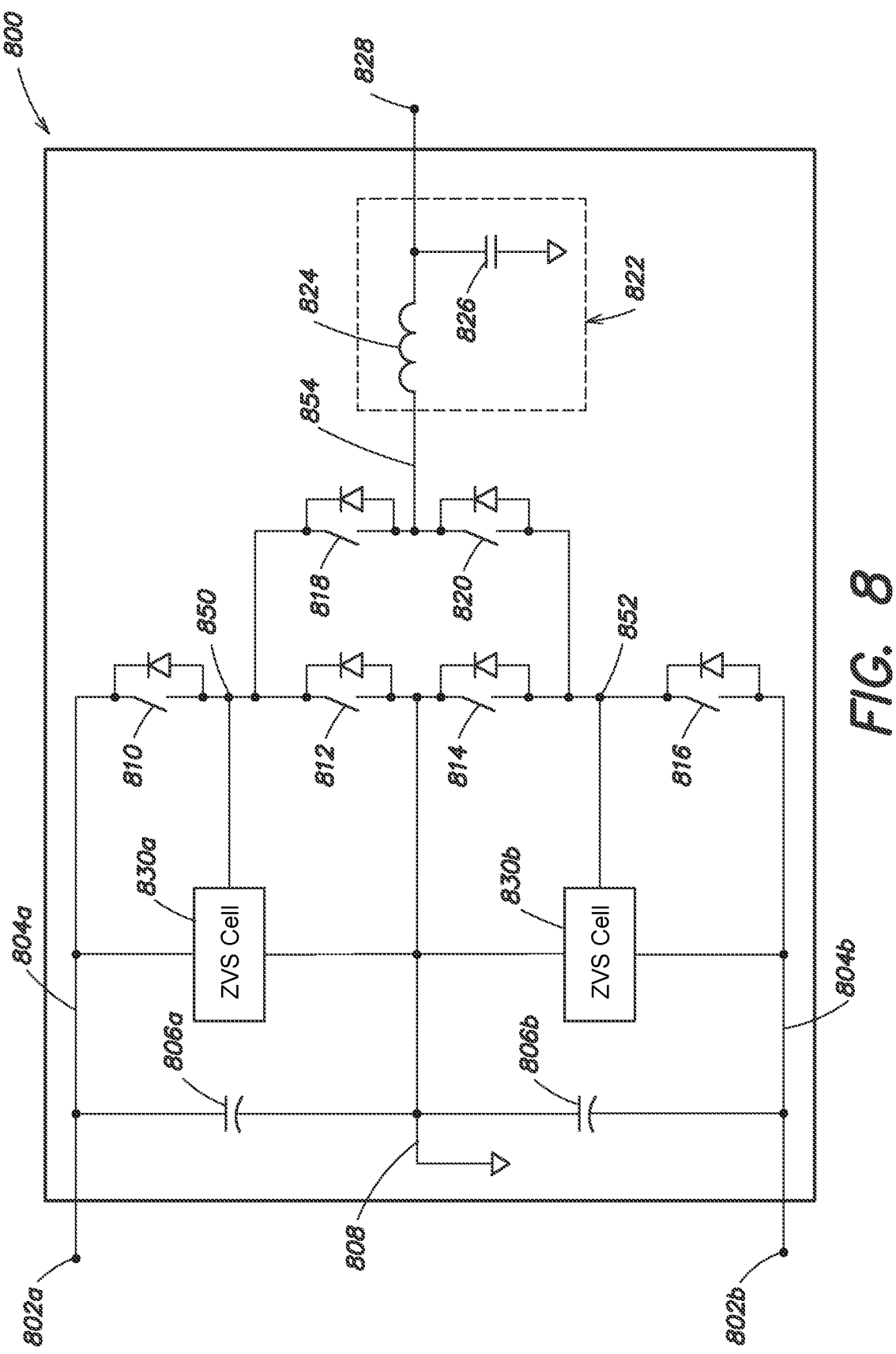
FIG. 8 is a schematic diagram of an inverter in accordance with aspects described herein.

For example, FIG. 8 is a schematic diagram of an inverter 800 in accordance with aspects described herein. In one example, the inverter 800 is configured as a ZVS active neutral point clamped (NPC) inverter. In some examples, the inverter 800 is configured to be included in a UPS (e.g., the inverter 108 of FIG. 1). As shown, the inverter 800 includes a first input 802a, a second input 802b, a first DC rail 804a, a second DC rail 804b, a first capacitor 806a, a second capacitor 806b, a neutral connection 808, a first switch 810, a second switch 812, a third switch 814, a fourth switch 816, a fifth switch 818, a sixth switch 820, a filter 822 including an inductor 824 and a third capacitor 826, an output 828, a first ZVS network 830a, and a second ZVS network 830b. In one example, the output 828 is coupled to a load (not shown). In one example, the first ZVS network 830a is coupled across the first and second switches 810, 812 and the second ZVS network 830b is coupled across the third and fourth switches 814, 816. In some examples, the first and second ZVS networks 830a, 830b each correspond to the ZVS network 230 of FIG. 2.

As shown, the first input 802a is coupled to the first DC rail 804a and the second input 802b is coupled to the second DC rail 804b. In one example, the first input 802a is configured to receive and provide a first DC voltage (+VDC) to the first DC rail 804a. Likewise, the second input 802b is configured to receive and provide a second DC voltage (−VDC) to the second DC rail 804b. In some examples, the first and second inputs 802a, 802b are configured to be coupled to a DC bus (e.g., DC bus 106). In one example, the first capacitor 806a is coupled between the first DC rail 804a and the neutral connection 808 and the second capacitor 806b is coupled between the second DC rail 804b and the neutral connection 808. The first switch 810 is coupled between the first DC rail 804a and a first midpoint 850, the second switch 812 is coupled between the first midpoint 850 and the neutral rail 808, the third switch 814 is coupled between the neutral rail 808 and a second midpoint 852, the fourth switch 816 is coupled between the second midpoint 852 and the second DC rail 804b, the fifth switch is coupled between the first midpoint 850 and a third midpoint 854, and the sixth switch 820 is coupled between the second midpoint 852 and the third midpoint 854. The filter 822 is coupled between the third midpoint 854 and the output 828. In some examples, the filter 822 may be optional.

In one example, the first ZVS network 830a is coupled across the first switch 810 and the second switch 812 and the second ZVS network 830b is coupled across the third switch 814 and the fourth switch 816. As shown, the first ZVS network 830a is coupled to the first DC rail 804a, the neutral rail 808, and the first midpoint 850. Likewise, the second ZVS network 830b is coupled to the second DC rail 804b, the neutral rail 808, and the second midpoint 852.

In one example, the first switch 810 and the second switch 812 correspond to a first half-bridge leg and the third switch 814 and the fourth switch 816 correspond to a second half-bridge leg. In some examples, the switching logic and controls described above with respect to the inverter 200 of FIG. 2 can be used to operate both the first and second half-bridge legs. The outputs of both the first and second half-bridge legs are connected to the output filter 822 via the fifth switch 818 and the sixth switch 820. In some examples, the fifth switch 818 shares a common gate drive signal with the third switch 814 of the second half-bridge leg and the sixth switch 820 shares a common gate drive signal with the second switch 812 of the first half-bridge leg. As such, in the positive half cycle of the output AC power, the third and fifth switches 814, 818 remain on (i.e., closed) while the sixth switch 820 is switching in sync with the second switch 812. In some examples, to reduce switching losses further, the sixth switch 820 can be operated in sync with the second switch 812 only near zero crossovers of the output AC power and can be turned off during the remaining portions of the positive half cycle. Likewise, in the negative half cycle of the output AC power, the second and sixth switches 812, 820 remain on (i.e., closed) while the fifth switch 818 is switching in sync with the third switch 814. In some examples, to reduce switching losses further, the fifth switch 818 can be operated in sync with the third switch 814 only near zero crossovers of the output AC power and can be turned off during the remaining portions of the negative half cycle. In one example, during zero crossovers of the output AC power, the fifth and sixth switches 818, 820 are switched together to ensure proper zero crossing.

In the above example, the first, second, third, and fourth switches 810-816 (i.e., the first and second half-bridge legs) are operated at high switching frequencies and the fifth and sixth switches 818, 820 are operated at low switching frequencies. As such, the ZVS cells 830a, 830b are coupled across the first and second half-bridge legs. In one example, the high-frequency switches 810-816 are configured as MOSFETs and the low-frequency switches 818, 820 are configured as IGBTs. However, in other examples, the switches 810-820 of the inverter 800 can be configured differently. As such, the ZVS cell(s) of the inverter 800 may be arranged differently.

Figure 9:
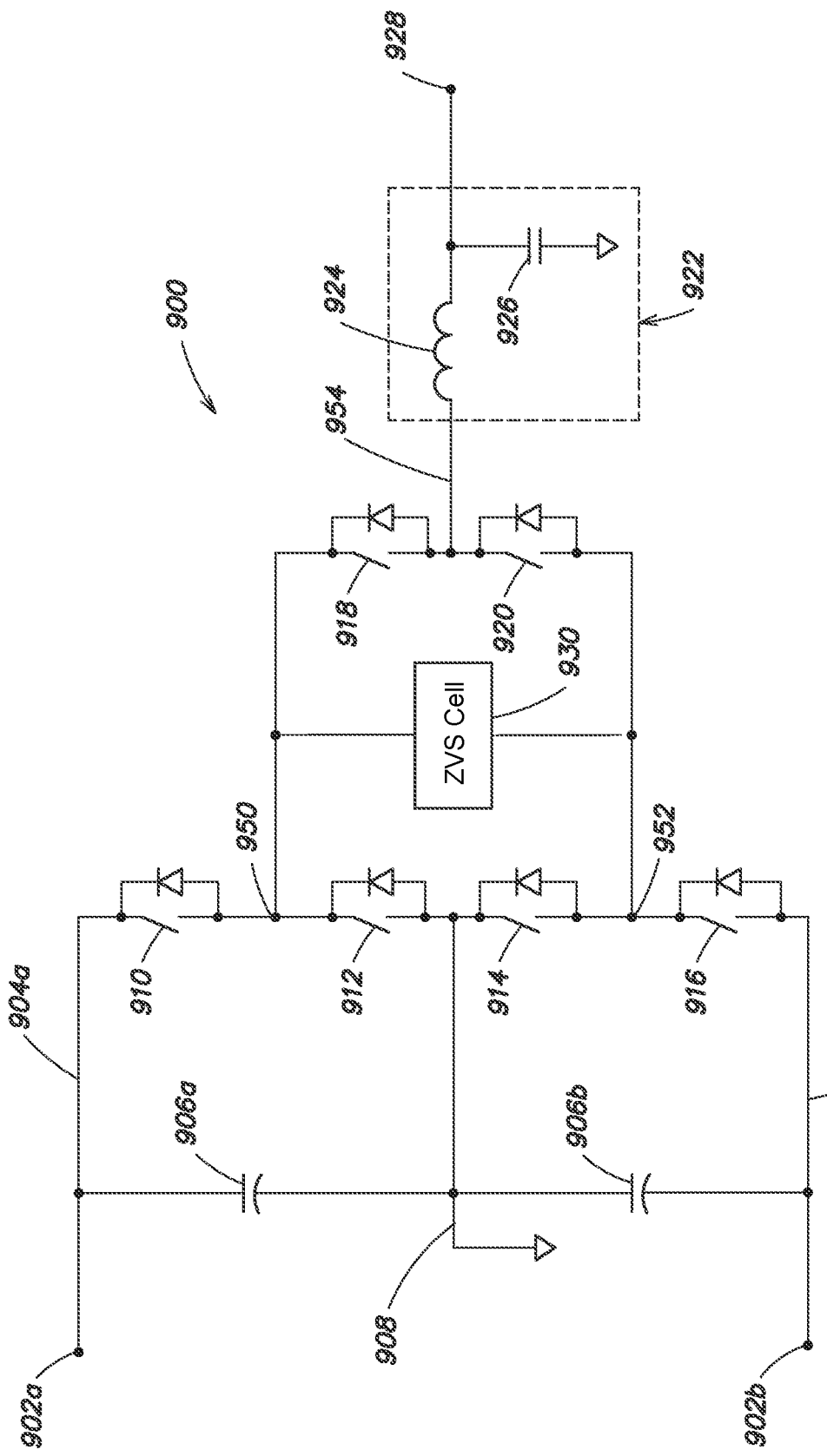
FIG. 9 is a schematic diagram of an inverter in accordance with aspects described herein.

For example, FIG. 9 is a schematic diagram of an inverter 900 in accordance with aspects described herein. In one example, the inverter 900 is configured as a ZVS active NPC inverter. As shown, the inverter 900 includes a first input 902a, a second input 902b, a first DC rail 904a, a second DC rail 904b, a first capacitor 906a, a second capacitor 906b, a neutral connection 908, a first switch 910, a second switch 912, a third switch 914, a fourth switch 916, a fifth switch 918, a sixth switch 920, a filter 922 including an inductor 924 and a third capacitor 926, an output 928, and a ZVS network 930. In some examples, the output 928 is coupled to a load (not shown). In one example, the ZVS network 930 is coupled across the fifth and sixth switches 918, 920. In some examples, the ZVS network 930 corresponds to the ZVS network 230 of FIG. 2.

As shown, the first input 902a is coupled to the first DC rail 904a and the second input 902b is coupled to the second DC rail 904b. In one example, the first input 902a is configured to receive and provide a first DC voltage (+VDC) to the first DC rail 904a. Likewise, the second input 902b is configured to receive and provide a second DC voltage (−VDC) to the second DC rail 904b. In some examples, the first and second inputs 902a, 902b are configured to be coupled to a DC bus (e.g., DC bus 106). In one example, the first capacitor 906a is coupled between the first DC rail 904a and the neutral connection 908 and the second capacitor 906b is coupled between the second DC rail 904b and the neutral connection 908. The first switch 910 is coupled between the first DC rail 904a and a first midpoint 950, the second switch 912 is coupled between the first midpoint 950 and the neutral rail 908, the third switch 914 is coupled between the neutral rail 908 and a second midpoint 952, the fourth switch 916 is coupled between the second midpoint 952 and the second DC rail 904b, the fifth switch is coupled between the first midpoint 950 and a third midpoint 954, and the sixth switch 920 is coupled between the second midpoint 952 and the third midpoint 954. The filter 922 is coupled between the third midpoint 954 and the output 928. In some examples, the filter 922 may be optional.

In one example, the ZVS network 930 is coupled across the fifth switch 918 and the sixth switch 920. As shown, the ZVS network 930 is coupled to the first midpoint 950, the second midpoint 952, and the third midpoint 954.

In one example, the inverter 900 is similar to the inverter 800 of FIG. 8, except the first, second, third, and fourth switches 910-916 are operated at low switching frequencies and the fifth and sixth switches 918, 920 are operated at high switching frequencies. As such, the ZVS cell 930a is coupled across the fifth and sixth switches 918, 920. In one example, the high-frequency switches 918, 920 are configured as MOSFETs and the low-frequency switches 910-916 are configured as IGBTs.

During a positive half cycle of the output AC power, the first switch 910 and the third switch 914 are turned on (i.e., closed), the second switch 912 and the fourth switch 916 are turned off (i.e., open), and the fifth and sixth switches 918, 920 are operated in conjunction with the ZVS network 930 as a half-bridge leg. In one example, the fifth and sixth switches 918, 920 are operated using the switching logic and controls described above with respect to the inverter 200 of FIG. 2. In some examples, the use of only one ZVS network can reduce the cost and improve the power density of the inverter 900.

As described above, improved soft switched voltage source inverters are provided herein. In at least one embodiment, the inverters include at least one resonant ZVS network configured to provide soft switching of the inverter switches. In some examples, the ZVS inverters are configured to operate with less complex timing controls, reduced conduction losses, and minimal EMI noise. In certain examples, the ZVS inverters are configured with silicon devices and can provide improved efficiency, power density, and cost.

Having thus described several aspects of at least one embodiment of this invention, it is to be appreciated various alterations, modifications, and improvements will readily occur to those skilled in the art. Such alterations, modifications, and improvements are intended to be part of this disclosure and are intended to be within the spirit of and scope of this invention. Accordingly, the foregoing description and drawings are by way of example only.

The invention claimed is:

1. An inverter comprising:
   an input configured to be coupled to a DC source and to receive input DC power from the DC source;
   an output configured to be coupled to a load and to provide output AC power to the load;
   a plurality of DC rails coupled to the input and configured to receive the input DC power from the DC source, the plurality of DC rails including a first DC rail, a second DC rail, and a neutral rail;
   a first midpoint;
   a second midpoint;
   a third midpoint;
   a plurality of switches coupled between the plurality of DC rails and configured to convert the input DC power into the output AC power, each switch of the plurality of switches having a parasitic capacitance, the plurality of switches including
      a first switch coupled between the first DC rail and the first midpoint,
      a second switch coupled between the first midpoint and the neutral rail,
      a third switch coupled between the neutral rail and the second midpoint,
      a fourth switch coupled between the second midpoint and the second DC rail,
      a fifth switch coupled between the first midpoint and the third midpoint, and
      a sixth switch coupled between the second midpoint and the third midpoint; and
   at least one zero-voltage switching (ZVS) network coupled across at least two switches of the plurality of switches, the at least one ZVS network including at least two inductors configured to resonate with the parasitic capacitance of at least one switch of the plurality of switches to provide soft switching of at least one switch of the plurality of switches.

2. The inverter of claim 1, further comprising a filter coupled between the third midpoint and the output.

3. The inverter of claim 1, wherein the at least one ZVS network includes a first auxiliary switch, a first diode, and a first inductor coupled in series between the first DC rail and the third midpoint.

4. The inverter of claim 3, wherein the at least one ZVS network includes a second auxiliary switch, a second diode, and a second inductor coupled in series between the second DC rail and the series of the first auxiliary switch, the first diode, and the first inductor.

5. The inverter of claim 4, wherein the at least one ZVS network includes a third diode having a cathode coupled between the first auxiliary switch and the first diode and an anode coupled to the second DC rail and a fourth diode having an anode coupled between the second auxiliary switch and the second diode and a cathode coupled to the first DC rail.

6. The inverter of claim 4, further comprising at least one controller coupled to the plurality of switches and the at least one ZVS network, the at least one controller being configured to:
   operate, during a positive half cycle of the output AC power, the first auxiliary switch such that the first inductor resonates with the parasitic capacitance of the first and second switches to provide soft-switching of the first switch; and
   operate, during a negative half cycle of the output AC power, the second auxiliary switch such that the second inductor resonates with the parasitic capacitance of the first and second switches to provide soft-switching of the second switch.

7. The inverter of claim 1, wherein the at least one ZVS network includes a first auxiliary switch, a first diode, and a first inductor coupled in series between the second DC rail and the third midpoint.

8. The inverter of claim 7, wherein the at least one ZVS network includes a second diode having an anode coupled between the first auxiliary switch and the first diode and a cathode coupled to the first DC rail.

9. The inverter of claim 1, further comprising at least one controller coupled to the plurality of switches, the at least one controller being configured to:
   operate the first, second, third, and fourth switches at a first switching frequency and the fifth and sixth switches at a second switching frequency to provide the output AC power, the first switching frequency being higher than the second switching frequency.

10. The inverter of claim 1, further comprising at least one controller coupled to the plurality of switches and the at least one ZVS network, the at least one controller being configured to:
    operate the first, second, third, and fourth switches at a first switching frequency and the fifth and sixth switches at a second switching frequency to provide the output AC power, the first switching frequency being lower than the second switching frequency.

11. A non-transitory computer-readable medium storing thereon sequences of computer-executable instructions for controlling an inverter including an input configured to be coupled to a DC source and to receive input DC power from the DC source, an output configured to be coupled to a load and to provide output AC power to the load, a plurality of DC rails coupled to the input and configured to receive the input DC power from the DC source, the plurality of rails including a first DC rail, a second DC rail, and a neutral rail, a plurality of switches coupled between the plurality of DC rails, the plurality of switches including a first switch coupled between the first DC rail and a first midpoint, a second switch coupled between the first midpoint and the neutral rail, a third switch coupled between the neutral rail and a second midpoint, a fourth switch coupled between the second midpoint and the second DC rail, a fifth switch coupled between the first midpoint and a third midpoint, and a sixth switch coupled between the second midpoint and the third midpoint, and at least one zero-voltage switching (ZVS) network coupled across at least two switches of the plurality of switches, the at least one ZVS network including at least two inductors, the sequences of computer-executable instructions including instructions that instruct at least one processor to:
    operate the plurality of switches to convert the input DC power into the output AC power; and
    operate the at least one ZVS network such that the at least two inductors resonate with a parasitic capacitance of at least one switch of the plurality of switches to provide soft switching of at least one switch of the plurality of switches.

12. The non-transitory computer-readable medium of claim 11, wherein the sequences of instructions include instructions that cause the at least one processor to:
    operate the first, second, third, and fourth switches at a first switching frequency and the fifth and sixth switches at a second switching frequency to provide the output AC power, the first switching frequency being higher than the second switching frequency.

13. The non-transitory computer-readable medium of claim 11, wherein a first ZVS network of the at least one ZVS network includes a first auxiliary switch and a first inductor coupled in series between the first DC rail and the first midpoint and a second auxiliary switch and a second inductor coupled in series between the neutral rail and the first midpoint and a second ZVS network of the at least one ZVS network includes a third auxiliary switch and a third inductor coupled in series between the neutral rail and the second midpoint and a fourth auxiliary switch and a fourth inductor coupled in series between the second DC bus and the second midpoint, the sequences of instructions include instructions that cause the at least one processor to:
  operate, during a positive half cycle of the output AC power, the first auxiliary switch such that the first inductor resonates with the parasitic capacitance of the first and second switches to provide soft-switching of the first switch; and
  operate, during a negative half cycle of the output AC power, the fourth auxiliary switch such that the fourth inductor resonates with the parasitic capacitance of the third and fourth switches to provide soft-switching of the fourth switch.

14. The non-transitory-computer readable medium of claim 11, wherein the sequences of instructions include instructions that cause the at least one processor to:
  operate the first, second, third, and fourth switches at a first switching frequency and the fifth and sixth switches at a second switching frequency to provide the output AC power, the first switching frequency being lower than the second switching frequency.

15. The non-transitory-computer readable medium of claim 11, wherein the at least one ZVS network includes a first auxiliary switch and a first inductor coupled in series between the first midpoint and the third midpoint and a second auxiliary switch and a second inductor coupled in series between the second midpoint and the third midpoint, the sequences of instructions including instructions that cause the at least one processor to:
  operate, during a positive half cycle of the output AC power, the first auxiliary switch such that the first inductor resonates with the parasitic capacitance of the fifth and sixth switches to provide soft-switching of the fifth switch; and
  operate, during a negative half cycle of the output AC power, the second auxiliary switch such that the second inductor resonates with the parasitic capacitance of the fifth and sixth switches to provide soft-switching of the sixth switch.

16. A method for controlling an inverter including an input configured to be coupled to a DC source and to receive input DC power from the DC source, an output configured to be coupled to a load and to provide output AC power to the load, a plurality of DC rails coupled to the input and configured to receive the input DC power from the DC source, the plurality of rails including a first DC rail, a second DC rail, and a neutral rail, a plurality of switches coupled between the plurality of DC rails, the plurality of switches including a first switch coupled between the first DC rail and a first midpoint, a second switch coupled between the first midpoint and the neutral rail, a third switch coupled between the neutral rail and a second midpoint, a fourth switch coupled between the second midpoint and the second DC rail, a fifth switch coupled between the first midpoint and a third midpoint, and a sixth switch coupled between the second midpoint and the third midpoint, and at least one zero-voltage switching (ZVS) network coupled across at least two switches of the plurality of switches, the at least one ZVS network including at least two inductors, the method comprising:
  operating the plurality of switches to convert the input DC power into the output AC power; and
  operating the at least one ZVS network such that the at least two inductors resonate with a parasitic capacitance of at least one switch of the plurality of switches to provide soft switching of at least one switch of the plurality of switches.

17. The method of claim 16, further comprising operating the first, second, third, and fourth switches at a first switching frequency and the fifth and sixth switches at a second switching frequency to provide the output AC power, the first switching frequency being higher than the second switching frequency.

18. The method of claim 16, wherein a first ZVS network of the at least one ZVS network includes a first auxiliary switch and a first inductor coupled in series between the first DC rail and the first midpoint and a second auxiliary switch and a second inductor coupled in series between the neutral rail and the first midpoint and a second ZVS network of the at least one ZVS network includes a third auxiliary switch and a third inductor coupled in series between the neutral rail and the second midpoint and a fourth auxiliary switch and a fourth inductor coupled in series between the second DC bus and the second midpoint, the method further comprising:
  operating, during a positive half cycle of the output AC power, the first auxiliary switch such that the first inductor resonates with the parasitic capacitance of the first and second switches to provide soft-switching of the first switch; and
  operating, during a negative half cycle of the output AC power, the fourth auxiliary switch such that the fourth inductor resonates with the parasitic capacitance of the third and fourth switches to provide soft-switching of the fourth switch.

19. The method of claim 16, further comprising:
  operating the first, second, third, and fourth switches at a first switching frequency and the fifth and sixth switches at a second switching frequency to provide the output AC power, the first switching frequency being lower than the second switching frequency.

20. The method of claim 16, wherein the at least one ZVS network includes a first auxiliary switch and a first inductor coupled in series between the first midpoint and the third midpoint and a second auxiliary switch and a second inductor coupled in series between the second midpoint and the third midpoint, the method further comprising:
  operating, during a positive half cycle of the output AC power, the first auxiliary switch such that the first inductor resonates with the parasitic capacitance of the fifth and sixth switches to provide soft-switching of the fifth switch; and
  operating, during a negative half cycle of the output AC power, the second auxiliary switch such that the second inductor resonates with the parasitic capacitance of the fifth and sixth switches to provide soft-switching of the sixth switch.

* * * * *